US010321086B2

(12) United States Patent
Ueda et al.

(10) Patent No.: US 10,321,086 B2
(45) Date of Patent: *Jun. 11, 2019

(54) SEMICONDUCTOR DEVICE

(71) Applicant: Renesas Electronics Corporation, Tokyo (JP)

(72) Inventors: Kazuhiro Ueda, Tokyo (JP); Fukashi Morishita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,997

(22) Filed: Sep. 14, 2017

(65) Prior Publication Data
US 2018/0007301 A1 Jan. 4, 2018

Related U.S. Application Data

(63) Continuation of application No. 14/962,744, filed on Dec. 8, 2015, now Pat. No. 9,769,410.

(30) Foreign Application Priority Data

Feb. 25, 2015 (JP) ................................. 2015-035368

(51) Int. Cl.
H04N 5/378 (2011.01)
H04N 5/3745 (2011.01)
H04N 5/347 (2011.01)

(52) U.S. Cl.
CPC ............ H04N 5/378 (2013.01); H04N 5/347 (2013.01); H04N 5/37457 (2013.01)

(58) Field of Classification Search
CPC ..... H04N 5/378; H04N 5/37457; H04N 5/347
See application file for complete search history.

(56) References Cited

U.S. PATENT DOCUMENTS 9,077,921 B2 7/2015 Hashimoto
9,473,724 B2 10/2016 Iwane
(Continued)

FOREIGN PATENT DOCUMENTS

EP 1 085 751 B1 11/2012
JP 3774597 B2 5/2006

OTHER PUBLICATIONS

United States Notice of Allowance dated May 24, 2017 in parent U.S. Appl. No. 14/962,744.
(Continued)

Primary Examiner — Albert H Cutler
(74) Attorney, Agent, or Firm — McGinn I.P. Law Group, PLLC.

(57) ABSTRACT

A semiconductor device includes a pixel array including a plurality of pixels arranged in a matrix, each pixel including a first switch and a second switch, a scanning circuit, in a first mode, enabling a first signal to be output from the pixel by setting the first and second switches to "off" in a period before a first timing, enabling a second signal to be output from the pixel by setting only the first switch to "on" for a predetermined period from the first timing, and enabling a third signal to be output from the pixel by setting the first and second switches to "on" for a predetermined period from a second timing after the first timing, and a first AD (Analog/Digital) converter, in a second mode, capable of performing AD conversion by comparing the difference between the second signal and the first signal with a reference signal.

15 Claims, 18 Drawing Sheets

(56) References Cited

U.S. PATENT DOCUMENTS

2013/0147979 A1  6/2013  McMahon
2013/0258149 A1  10/2013  Choi
2014/0192249 A1* 7/2014  Kishi ................. H04N 5/23212
                                              348/349
2014/0307134 A1* 10/2014 Kanda ................ H04N 5/23212
                                              348/280

OTHER PUBLICATIONS

United States Non-Final Office Action dated Dec. 13, 2016 in parent U.S. Appl. No. 14/962,744.

* cited by examiner

SEMICONDUCTOR DEVICE

CROSS-REFERENCE TO RELATED APPLICATIONS

The present application is a Continuation Application of U.S. patent application Ser. No. 14/962,744, filed on Dec. 8, 2015, which is based on Japanese Patent Application No. 2015-035368 filed on Feb. 25, 2015 including the specification, drawings and abstract is incorporated herein by reference in its entirety.

BACKGROUND

The present invention relates to a semiconductor device and, for example, relates to an imaging element.

Conventionally, an imaging element having a focus detecting function is known.

For example, an imaging element described in patent literature 1 includes a plurality of pixels including a first photoelectric conversion unit for photoelectric-converting a light flux from a first region of an exit pupil, a second photoelectric conversion unit for photoelectric-converting a light flux from a second region of the exit pupil, amplifying means provided commonly for the first and second photoelectric conversion units, first transfer means transferring a signal of the first photoelectric conversion unit to the amplifying means, and second transfer means transferring a signal of the second photoelectric conversion unit to the amplifying means. The imaging element has driving means controlling a first operation of mixing a signal of the first photoelectric conversion unit and a signal of the second photoelectric conversion unit by an input unit of the amplifying means and outputting a mixed signal from the amplifying means, and a second operation of selecting outputting the signal of the first photoelectric conversion unit and the signal of the second photoelectric conversion unit from the amplifying means.

RELATED ART LITERATURE

Patent Literature

Patent Literature 1: Japanese Patent No. 3,774,597

SUMMARY

An imaging element as described in Patent Literature 1, however, has a problem that complicated control as illustrated in FIG. 16 is necessary to read data for focus detection.

The other problems and novel features will become apparent from the description of the specification and the appended drawings.

In an embodiment, in the case of shooting a picture with focus detection, a scanning circuit makes a first signal output from a pixel by setting first and second switches to "off" in a period before a first timing, makes a second signal output from the pixel by setting only the first switch to "on" for a predetermined period from the first timing, and makes a third signal output from the pixel by setting the first and second switches to "on" for a predetermined period from a second timing after the first timing. In the case of shooting a moving picture with focus detection, a first AD converter can perform AD conversion by comparing the difference between the second signal and the first signal with a reference signal. In the case of shooting a moving picture with focus detection, a second AD converter can perform AD conversion by comparing the difference between a third signal and the second signal with the reference signal.

According to the embodiment, data reading for focus detection can be executed with simple control.

DETAILED DESCRIPTION

Hereinbelow, embodiments of the present invention will be described with reference to the drawings.

First Embodiment

Figure 1:
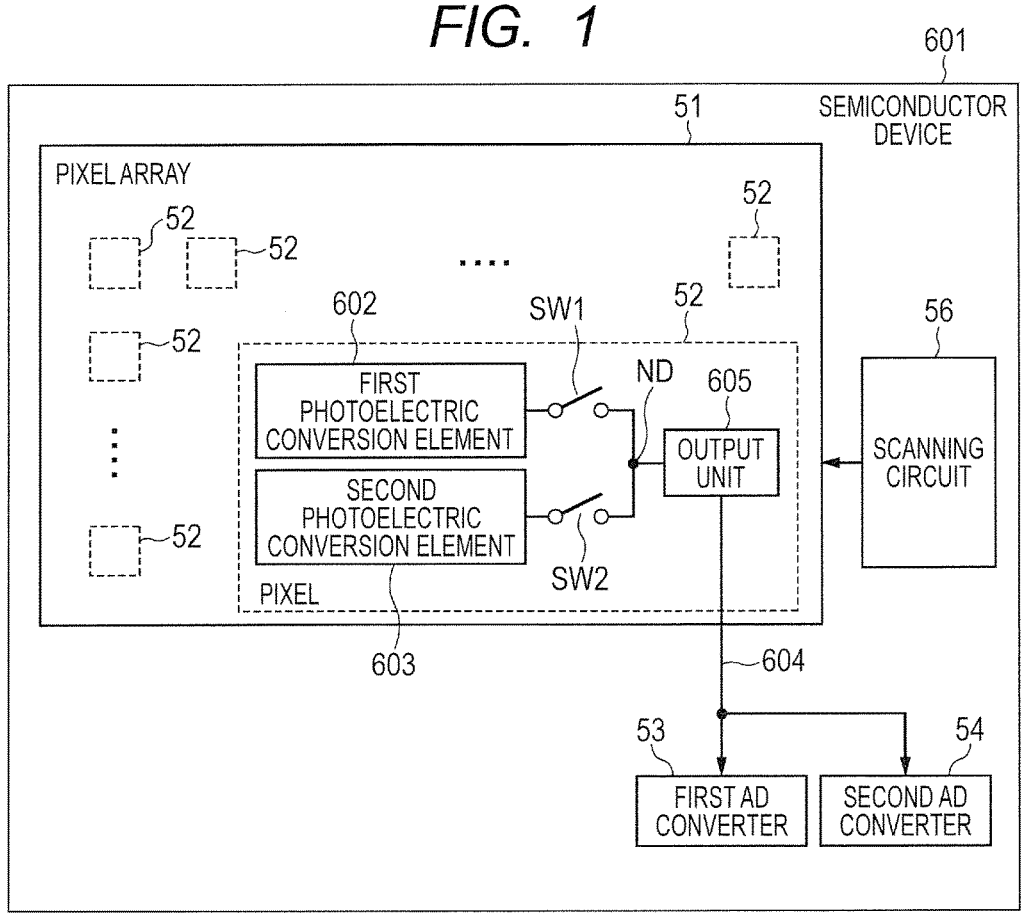
FIG. 1 is a diagram illustrating the configuration of a semiconductor device of a first embodiment.
Figure 2:
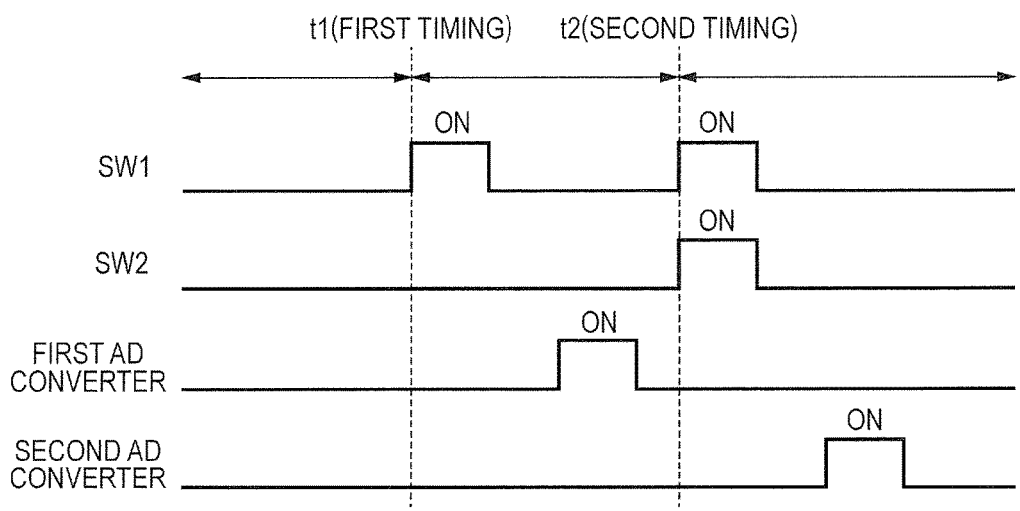
FIG. 2 is a diagram illustrating operation timings of the semiconductor device.

FIG. 1 is a diagram illustrating the configuration of a semiconductor device 601 of a first embodiment. FIG. 2 is a diagram illustrating operation timings of the semiconductor device 601.

As illustrated in FIG. 1, the semiconductor device 601 has a pixel array 51, a scanning circuit 56, a controller 55, a first AD converter 53, a second AD converter 54, and a data output line 64.

The pixel array 51 includes a plurality of pixels 52 arranged in a matrix.

The pixel 52 includes a first photoelectric conversion element 602, a second photoelectric conversion element 603, a node ND, an output unit 605 outputting voltage of the node ND to the data output line 604, a first switch SW1 between the first photoelectric conversion element 602 and the node ND, and a second switch SW2 between the second photoelectric conversion element 603 and the node ND.

The scanning circuit 56 can output a first signal (dark signal) from the pixel 52 by setting the first and second switches SW1 and SW2 to "off" in a period before a first timing.

The scanning circuit 56 can output a second signal (a signal of the first photoelectric conversion element 602) from the pixel 52 by setting only the first switch SW1 to "on" in a predetermined period from the first timing.

The scanning circuit 56 can output a third signal (a signal obtained by synthesizing a signal of the first photoelectric conversion element 602 and a signal of the second photoelectric conversion element 603) from the pixel 52 by setting the first and second switches SW1 and SW2 to "on" in a predetermined period after a second timing after the first timing.

The first AD converter 53 can perform AD conversion by comparing the difference between the second signal and the first signal with a reference signal. A signal obtained by the AD conversion refers to a signal of the first photoelectric conversion element 602.

The second AD converter 54 can perform AD conversion by comparing the difference between the third signal and the second signal with a reference signal. A signal obtained by the AD conversion refers to a signal of the second photoelectric conversion element 603.

As described above, in the embodiment, signals of two photoelectric conversion elements can be read by a simple scan of using two AD converters and only controlling two switches. By using the ratio of the magnitudes of the signals of the two photoelectric conversion elements, a focus can be detected.

The first AD converter 53 may execute AD conversion by comparing the first signal with the reference signal in a first period and execute AD conversion by comparing the difference between the second signal and the first signal with the reference signal in a second period.

The second AD converter 54 may execute AD conversion by comparing the second signal with the reference signal in a second period and execute AD conversion by comparing the difference between the third signal and the second signal with the reference signal in a third period.

Second Embodiment

Figure 3:
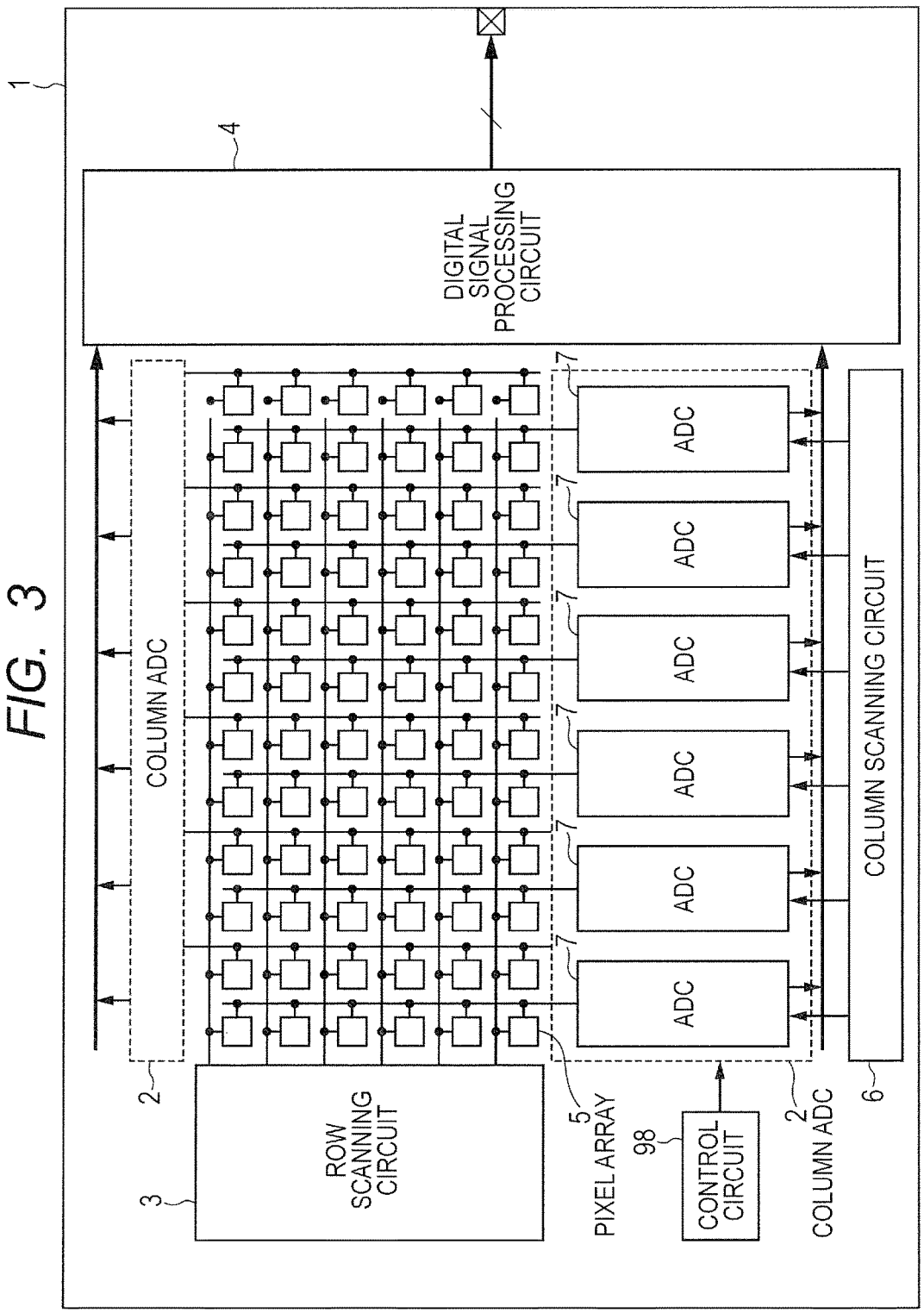
FIG. 3 is a diagram illustrating the configuration of a CMOS image sensor as an example of a semiconductor device of a second embodiment.

FIG. 3 is a diagram illustrating the configuration of a CMOS (Complementary MOS) image sensor 1 as an example of a semiconductor device of a second embodiment.

As illustrated in FIG. 3, the CMOS image sensor 1 has a pixel array 5, a column ADC 2, a row scanning circuit 3, a column scanning circuit 6, a digital signal processing circuit 4, and a control circuit 98.

The pixel array 5 has a plurality of pixels arranged in a matrix.

The column ADC 2 has ADCs 7 arranged in columns of the pixels. The column ADCs 2 are disposed on the upper and lower sides of the pixel array 5, and one ADC 7 is disposed in the width of the pixels in two columns.

The ADC 7 converts an analog signal output from the pixel to a digital signal and outputs the digital signal to the digital signal processing circuit 4.

The row scanning circuit 3 performs a selecting process in the row direction of the pixel array 5.

The column scanning circuit 6 performs a selecting process in the column direction of the pixel array 5.

The digital signal processing circuit 4 executes an arithmetic process on a digital signal output from the column ADC 2.

The control circuit 98 controls operation of the column ADC.

Figure 4:
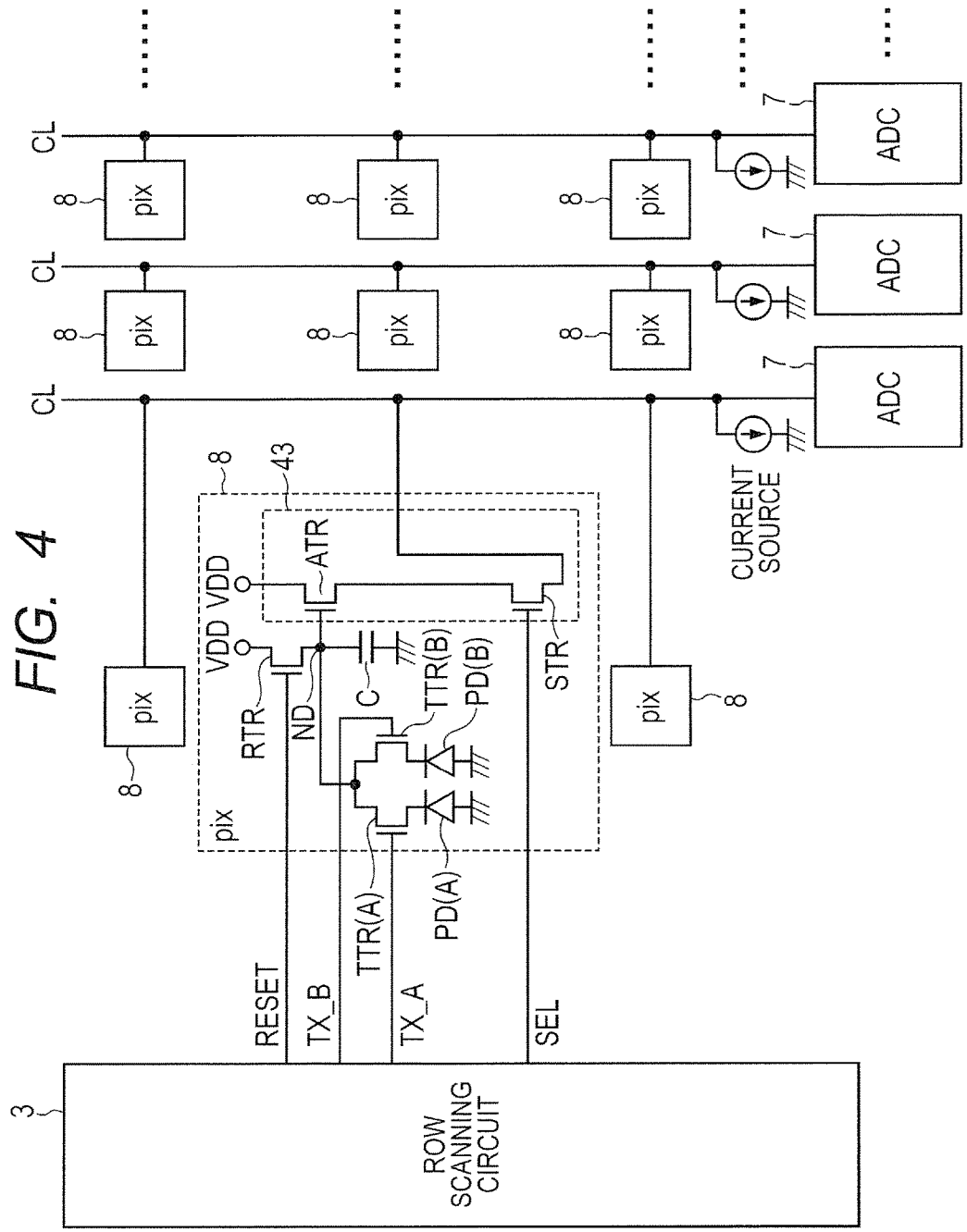
FIG. 4 is a diagram illustrating the configuration of pixels included in a pixel array.

FIG. 4 is a diagram illustrating the configuration of pixels (pix) 8 included in the pixel array 5.

A plurality of pixels in the same column included in the pixel array 5 are coupled to a common output line CL. The pixel 8 has a photodiode PD(A), a photodiode PD(B), a transfer transistor TTR(A), a transfer transistor TTR(B), a reset transistor RTR, an amplification transistor ATR, and a selection transistor STR.

In a path between the node ND and the ground, the transfer transistor TTR(A) and the photodiode PD(A) are coupled in series. In another path between the node ND and the ground, the transfer transistor TTR(B) and the photodiode PD(B) are coupled in series.

The photodiodes PD(A) and PD(B) convert a light signal received via a not-illustrated lens to an electric signal. The transfer transistor TTR(A) transfers an electric signal generated by the photodiode PD(A) to the node ND.

The transfer transistor TTR(B) transfers an electric signal generated by the photodiode PD(B) to the node ND. The transfer transistor TTR(A) is set to "on" when a transfer control signal TX_A output from the row scanning circuit 3 is at the high level. The transfer transistor TTR(B) is set to "on" when a transfer control signal TX_B output from the row scanning circuit 3 is at the high level.

The reset transistor RTR is disposed between a power supply VDD and the node ND. The reset transistor RTR is set to "on" when a reset signal RESET output from the row scanning circuit 3 is at the high level to charge the node ND to the high level (reset).

The amplification transistor ATR and the selection transistor STR are coupled in series between the power supply VDD and the common output line CL. The common output line CL is provided for each column. The common output line CL receives signals output from all of the pixels in one column. The common output line CL is coupled to a current source IS.

The gate of the amplification transistor ATR is coupled to the node ND. A parasitic capacitance C exists between the node ND and the ground.

The gate of the selection transistor STR is set to "on" when a selection signal SEL output from the row scanning circuit 3 is at the high level.

Figure 5:
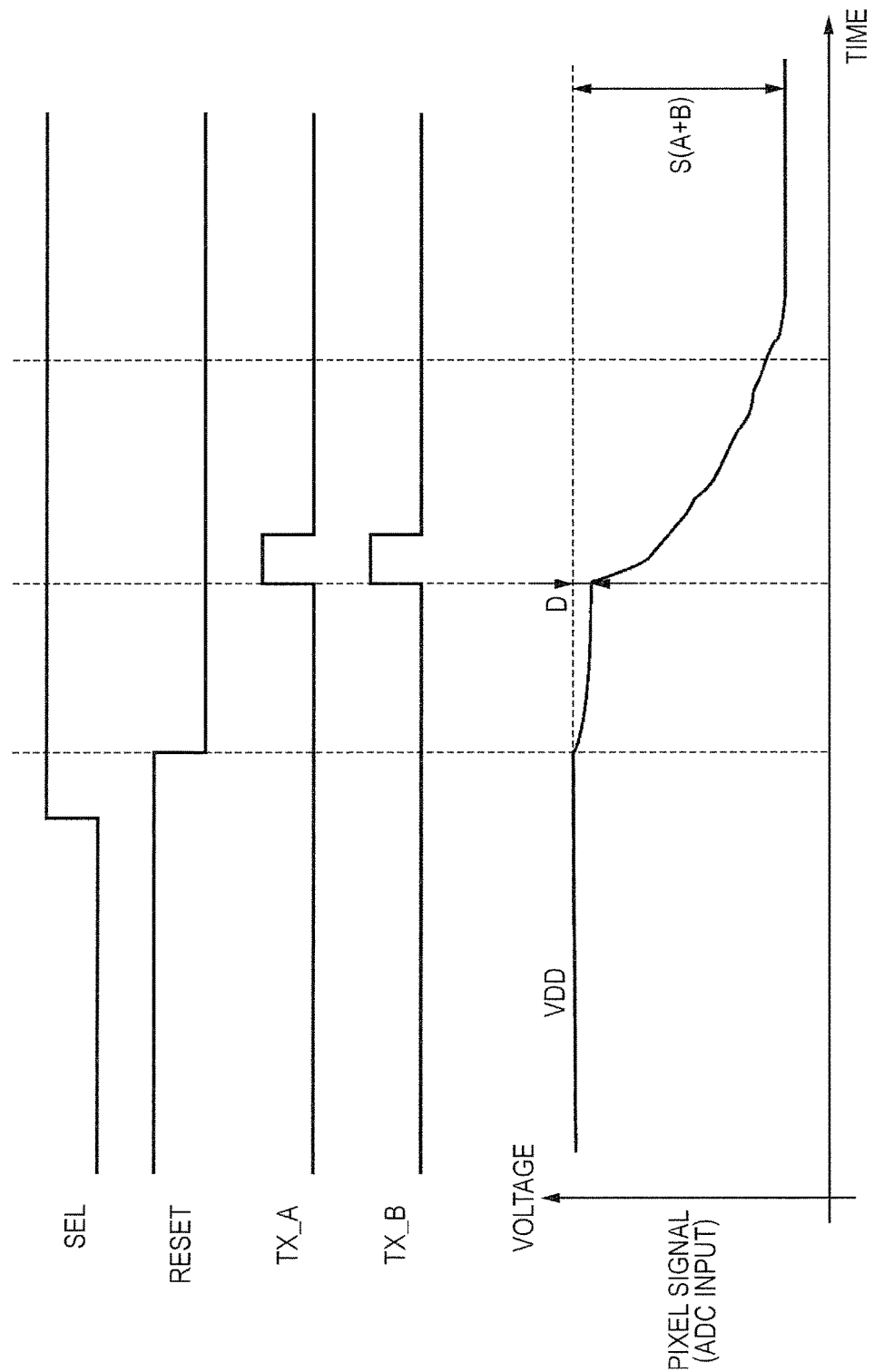
FIG. 5 is a timing chart at the time of reading data from a pixel in the case where focus detection is not performed.

FIG. 5 is a timing chart at the time of reading data from a pixel in the case where focus detection is not performed.

The row scanning circuit 3 sets the selection signal SEL to the low level, sets the reset signal RESET to the high level, and sets the transfer control signals TX_A and TX_B to the low level. At this time, the selection transistor STR becomes off, the reset transistor RTR becomes on, and the transfer transistors TTR(A) and TTR(B) become off. As a result, the voltage of the common output line CL (the voltage supplied to the ADC 7) maintains a precharge voltage VDD.

After that, the row scanning circuit 3 sets the selection signal SEL to the high level and further sets the reset signal RESET to the low level. At this time, the selection transistor STR becomes on, the reset transistor RTR becomes off, and the transfer transistors TTR(A) and TTR(B) become off. By current (dark current) leaked from the transfer transistors TTR(A) and TTR(B), the voltage of the node ND decreases, and the voltage supplied to the ADC 7 also decreases. The signal voltage supplied to the ADC 7 in this period is expressed as a dark signal D.

After that, the row scanning circuit 3 sets the transfer control signals TX_A and TX_B at the high level only for a predetermined period. By the operation, the transfer transistors TTR(A) and TTR(B) become on. Due to the influence of the voltage generated by the photodiode PD (A) and the voltage generated by the photodiode PD(B), the voltage at the node ND decreases, and the voltage supplied to the ADC 7 also decreases. A signal voltage supplied to the ADC 7 in this period is expressed as S (A+B). A signal obtained by subtracting D from S(A+B) is a signal obtained by combining the signal output from the photodiode PD (A) and the signal output from the photodiode PD(B).

Figure 6:
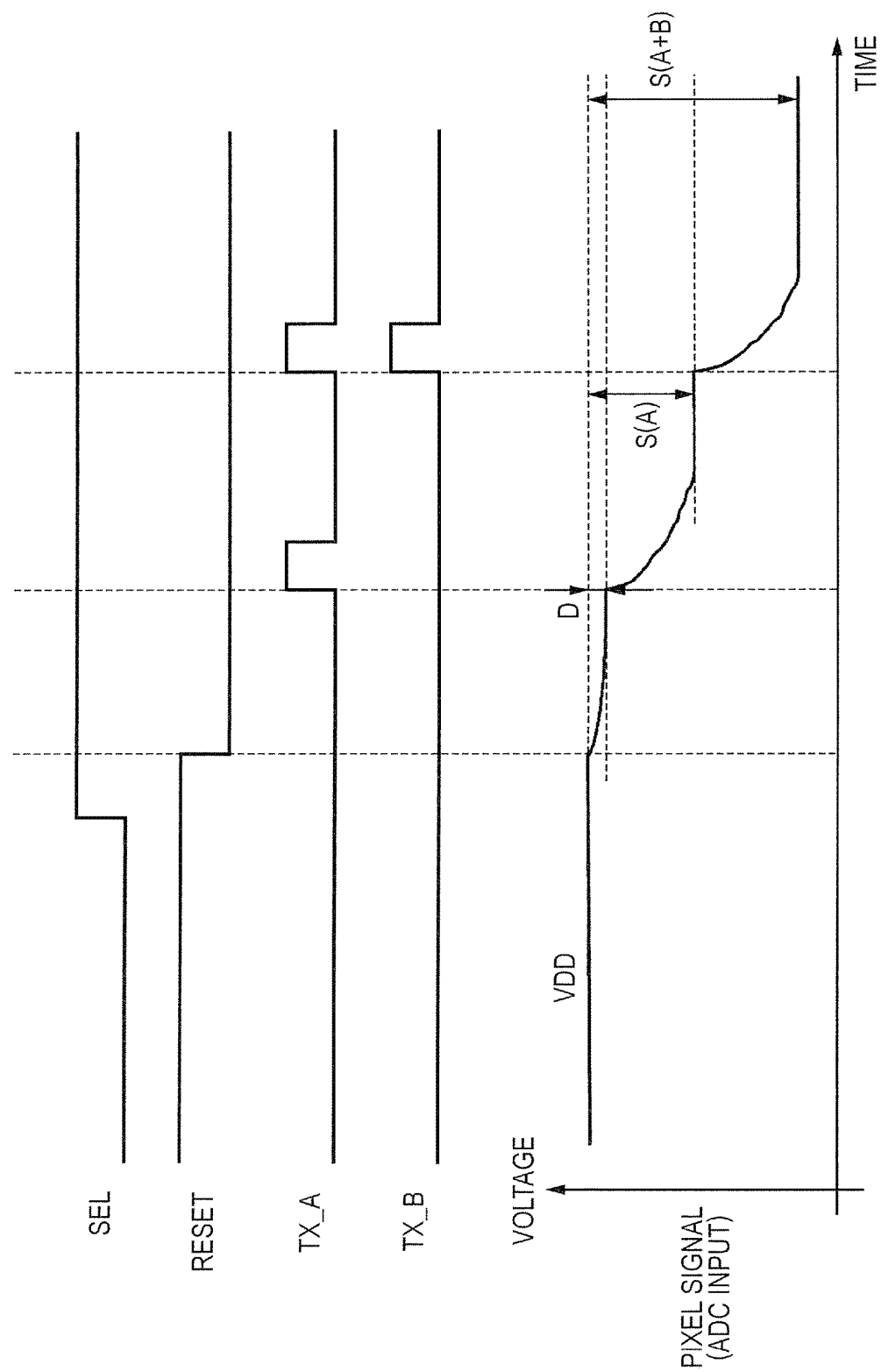
FIG. 6 is a timing chart at the time of reading data from a pixel in the case where the focus detection is performed.

FIG. 6 is a timing chart at the time of reading data from a pixel in the case where the focus detection is performed.

The row scanning circuit 3 sets the selection signal SEL to the low level, sets the reset signal RESET to the high level, and sets the transfer control signals TX_A and TX_B to the low level. At this time, the selection transistor STR becomes off, the reset transistor RTR becomes on, and the transfer transistors TTR(A) and TTR(B) become off. As a result, the voltage of the common output line CL (the voltage supplied to the ADC 7) maintains the precharge voltage VDD.

After that, the row scanning circuit 3 sets the selection signal SEL to the high level and further sets the reset signal RESET to the low level. At this time, the selection transistor STR becomes on, the reset transistor RTR becomes off, and the transfer transistors TTR(A) and TTR(B) become off. By current (dark current) leaked from the transfer transistors TTR(A) and TTR(B), the voltage at the node ND decreases, and the voltage supplied to the ADC 7 also decreases. The signal voltage supplied to the ADC 7 in this period is expressed as the dark signal D.

After that, the row scanning circuit 3 sets the transfer control signal TX_A at the high level only for a predetermined period. By the operation, the transfer transistor TTR (A) becomes on. Due to the influence of the voltage generated by the photodiode PD(A), the voltage at the node ND decreases, and the voltage supplied to the ADC 7 also decreases. A signal voltage supplied to the ADC 7 in this period is expressed as S(A).

A value obtained by subtracting D from S (A) expresses a signal output from the photodiode PD(A).

After that, the row scanning circuit 3 sets the transfer control signals TX_A and TX_B at the high level only for a predetermined period. By the operation, the transfer transistors TTR(A) and TTR(B) become on. Due to the influence of the voltage generated by the photodiode PD (A) and the voltage generated by the photodiode PD(B), the voltage at the node ND decreases, and the voltage supplied to the ADC 7 also decreases. A signal voltage supplied to the ADC 7 in this period is expressed as S(A+B).

A value obtained by subtracting S(A) from S(A+B) denotes a signal output from the photodiode PD(B).

The digital signal processing circuit 4 detects whether a focus is on or not, for example, on the basis of the ratio between the magnitude of the signal output from the photodiode PD(A) and the magnitude of the signal output from the photodiode PD(B).

Figure 7:
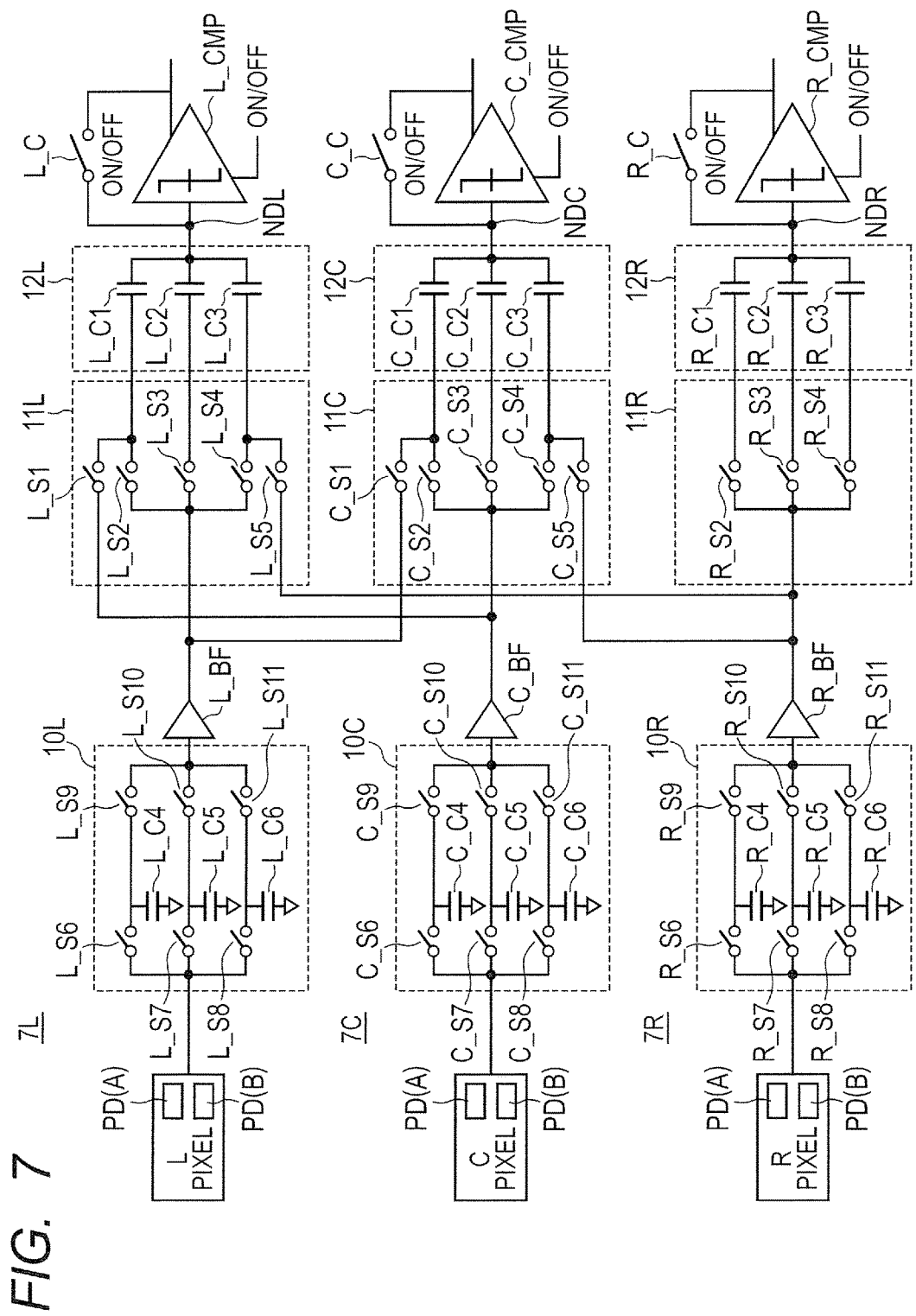
FIG. 7 is a diagram illustrating the configuration of ADCs of the second embodiment.

FIG. 7 is a diagram illustrating the configuration of the ADCs 7 of the second embodiment.

In a plurality of pixels in the pixel array 5, a group is comprised of three adjacent pixels. In the following, the pixel on the left side in one group is called an L pixel, the pixel in the center is called a C pixel, and the pixel on the right side is called an R pixel.

An ADC 7L corresponds to the L pixel. An ALC 7C corresponds to the C pixel. An ADC 7R corresponds to the R pixel.

The ADC 7L has a sample circuit 10L, a buffer L_BF, a coupling switching circuit 11L, an input circuit 12L, a comparator L_CMP, and a switch L_C. The ADC 7C has a sample circuit 10C, a buffer C_BF, a coupling switching circuit 11C, an input circuit 12C, a comparator C_CMP, and a switch C_C. The ADC 7R has a sample circuit 10R, a buffer R_BF, a coupling switching circuit 11R, an input circuit 12R, a comparator R_CMP, and a switch R_C.

The sample circuit 10L has switches L_S6 to L_S11 and capacitors L_C4 to L_C6. In a first path, the switches L_S6 and L_S9 are disposed in series. The switch L_S6 is coupled to the L pixel. The switch L_S9 is coupled to the buffer L_BF. At a node between the switches L_S6 and L_S9, the capacitor L_C4 for sampling is disposed. In a second path, the switches L_S7 and L_S10 are disposed in series. The switch L_S7 is coupled to the L pixel. The switch L_S10 is coupled to the buffer L_BF. At a node between the switches L_S7 and L_S10, the capacitor L_C5 for sampling is disposed. In a third path, the switches L_S8 and L_S11 are disposed in series. The switch L_S8 is coupled to the L pixel. The switch L_S11 is coupled to the buffer L_BF. At a node between the switches L_S8 and L_S11, the capacitor L_C6 for sampling is disposed.

The buffer L_BF has inputs coupled to the switches L_S9, L_S10, and L_S11 and outputs coupled to the coupling switching circuits 11L and 11C.

The coupling switching circuit 11L enables an output of the buffer L_BF and an output of the buffer C_BF to be supplied to the input circuit 12L. The coupling switching circuit 11L includes switches L_S1 to L_S5. The input circuit 12L includes capacitors L_C1, L_C2, and L_C3. The switch L_S1 is disposed between the output of the buffer C_BF and the capacitor L_C1. The switch L_S2 is disposed between the output of the buffer L_BF and the capacitor L_C1. The switch L_S3 is disposed between the output of the buffer L_BF and the capacitor L_C2. The switch L_S4 is disposed between the output of the buffer L_BF and the capacitor L_C3. The switch L_S5 is disposed between the output of the buffer R_BF and the capacitor L_C3. The capacitors L_C1, L_C2, and L_C3 are coupled to an input node NDL of the comparator L_CMP.

The comparator L_CMP compares, when it is set to be on, the voltage at the input node NDL with reference voltage, thereby executing AD conversion. Although not illustrated, by counting comparison results while changing the level of the reference voltage, a digital signal according to the level of the voltage at the input node NDL is obtained. The operations of the other comparators C_CMP and R_CMP are similar to the above. The switch L_C is provided between the input and the output of the comparator L_CMP. The switch L_C is used for auto-zero operation.

The sample circuit 10C has switches C_S6 to C_S11 and capacitors C_C4 to C_C6. In a first path, the switches C_S6 and C_S9 are disposed in series. The switch C_S6 is coupled to the C pixel. The switch C_S9 is coupled to the buffer C_BF. At a node between the switches C_S6 and C_S9, the capacitor C_C4 for sampling is disposed. In a second path, the switches C_S7 and C_S10 are disposed in series. The switch C_S7 is coupled to the C pixel. The switch C_S10 is coupled to the buffer C_BF. At a node between the switches C_S7 and C_S10, the capacitor C_C5 for sampling is disposed. In a third path, the switches C_S8 and C_S11 are disposed in series. The switch C_S8 is coupled to the C pixel. The switch C_S11 is coupled to the buffer C_BF. At a node between the switches C_S8 and C_S11, the capacitor C_C6 for sampling is disposed.

The buffer C_BF has inputs coupled to the switches C_S9, C_S10, and C_S11 and outputs coupled to the coupling switching circuits 11L and 11C.

The coupling switching circuit 11C enables an output of the buffer L_BF, an output of the buffer C_BF, and an output of the buffer R_BF to be supplied to the input circuit 12C. The coupling switching circuit 11C includes switches C_S1 to C_S5. The input circuit 12C includes capacitors C_C1, C_C2, and C_C3. The switch C_S1 is disposed between the output of the buffer L_BF and the capacitor C_C1. The switch C_S2 is disposed between the output of the buffer C_BF and the capacitor C_C1. The switch C_S3 is disposed between the output of the buffer C_BF and the capacitor C_C2. The switch C_S4 is disposed between the output of the buffer C_BF and the capacitor C_C3. The switch C_S5 is disposed between the output of the buffer R_BF and the capacitor C_C3.

The capacitors C_C1, C_C2, and C_C3 are coupled to an input node NDC of the comparator C_CMP.

The comparator C_CMP compares, when it is set to be on, the voltage at the input node NDL with reference voltage, thereby outputting a digital signal. The switch C_C is provided between the input and the output of the comparator C_CMP. The switch C_C is used for auto-zero operation.

The sample circuit 10R has switches R_S6 to R_S11 and capacitors R_C4 to R_C6. In a first path, the switches R_S6 and R_S9 are disposed in series. The switch R_S6 is coupled to the R pixel. The switch R_S9 is coupled to the buffer R_BF. At a node between the switches R_S6 and R_S9, the capacitor R_C4 for sampling is disposed. In a second path, the switches R_S7 and R_S10 are disposed in series. The switch R_S7 is coupled to the R pixel. The switch R_S10 is coupled to the buffer R_BF. At a node between the switches R_S7 and R_S10, the capacitor R_C5 for sampling is disposed. In a third path, the switches R_S8 and R_S11 are disposed in series. The switch R_S8 is coupled to the R pixel. The switch R_S11 is coupled to the buffer R_BF. At a node between the switches R_S8 and R_S11, the capacitor R_C6 for sampling is disposed.

The buffer R_BF has inputs coupled to the switches R_S9, R_S10, and R_S11 and outputs coupled to the coupling switching circuits 11L, 11C, AND 11R. The coupling switching circuit 11R enables an output of the buffer R_BF to be supplied to the input circuit 12R. The coupling switching circuit 11R includes switches R_S2 to R_S4. The input circuit 12R includes capacitors R_C1, R_C2, and R_C3. The switch R_S2 is disposed between the output of the buffer R_BF and the capacitor R_C1. The switch R_S3 is disposed between the output of the buffer R_BF and the capacitor R_C2. The switch R_S4 is disposed between the output of the buffer R_BF and the capacitor R_C3. The capacitors R_C1, R_C2, and R_C3 are coupled to the input node NDC of the comparator R_CMP.

The comparator R_CMP compares, when it is set to be on, the voltage at the input node NDL with reference voltage, thereby executing AD conversion.

The switch R_C is provided between the input and the output of the comparator R_CMP. The switch R_C is used for auto-zero operation.

(A) Operation at the Time of Shooting Still Picture without Focus Detection

Figure 8:
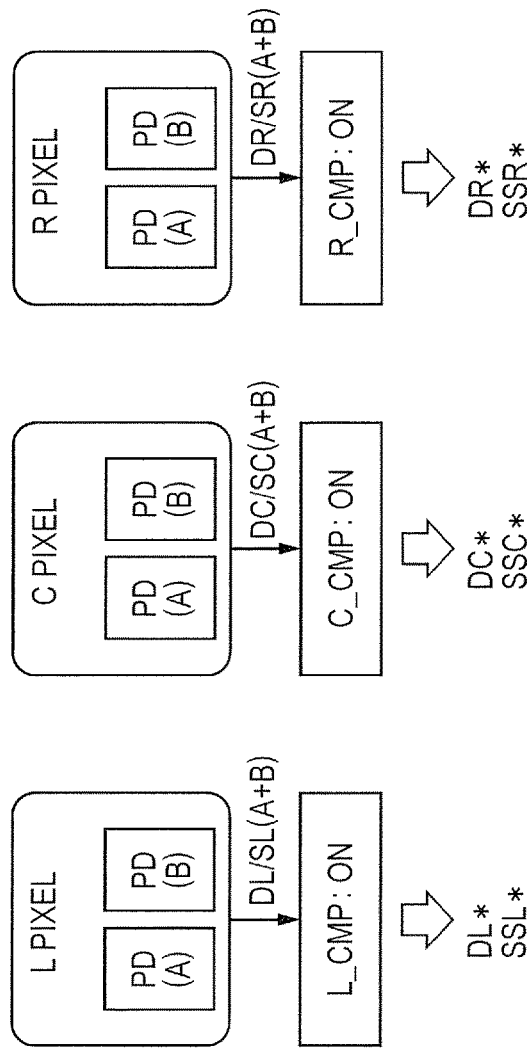
FIG. 8 is a diagram for explaining operations of pixels and ADCs at the time of shooting a still picture without focus detection.

FIG. 8 is a diagram for explaining operations of the pixels 8 and the ADCs 7 at the time of shooting a still picture without focus detection.

The control circuit 98 sets the comparator L_CMP in the ADC 7L, the comparator C_CMP in the ADC 7C, and the comparator R_CMP in the ADC 7R to "on".

First, a dark signal DL is output from the L pixel to the comparator L_CMP. Simultaneously, a dark signal DC is output from the C pixel to the comparator C_CMP and a dark signal DR is output from the R pixel to the comparator R_CMP. The comparators L_CMP, C_CMP, and R_CMP execute the auto zero operation. After that, the comparators L_CMP, C_CMP, and R_CMP AD-convert the dark signals DL, DC, and DR and output digital signals DL*, DC*, and DR*, respectively.

Next, a synthesized signal SL(A+B) of the output of the photodiode PD(A) and the output of the photodiode PD(B) from the L pixel is output to the comparator L_CMP. Simultaneously, a synthesized signal SC(A+B) of the output of the photodiode PD(A) and the output of the photodiode PD(B) from the C pixel is output to the comparator C_CMP, and a synthesized signal SR(A+B) of the output of the photodiode PD(A) and the output of the photodiode PD(B) from the R pixel is output to the comparator R_CMP.

The comparator L_CMP AD-converts the difference SSL{=SL(A+B)−DL} and outputs a digital signal SSL*. The digital signal SSL* expresses a signal obtained by synthesizing a signal output from the photodiode PD(A) of the pixel L and a signal output from the photodiode PD(B). The comparator C_CMP AD-converts the difference SSC{=SC(A+B)−DC} and outputs a digital signal SSC*. The digital signal SSC* expresses a signal obtained by synthesizing a signal output from the photodiode PD (A) of the pixel C and a signal output from the photodiode PD (B). The comparator R_CMP AD-converts the difference SSR{=SR(A+B)−DR} and outputs a digital signal SSR*. The digital signal SSR* expresses a signal obtained by synthesizing a signal output from the photodiode PD (A) of the pixel R and a signal output from the photodiode PD(B).

The digital signal processing circuit 4 obtains a synthesized signal of the pixel L from which variations of the elements are eliminated by arithmetic operation of SSL*−DL*. The digital signal processing circuit 4 obtains a synthesized signal of the pixel C from which variations of the elements are eliminated by arithmetic operation of SSC*−DC*. The digital signal processing circuit 4 obtains a synthesized signal of the pixel R from which variations of the elements are eliminated by arithmetic operation of SSR*−DR*.

Figure 9:
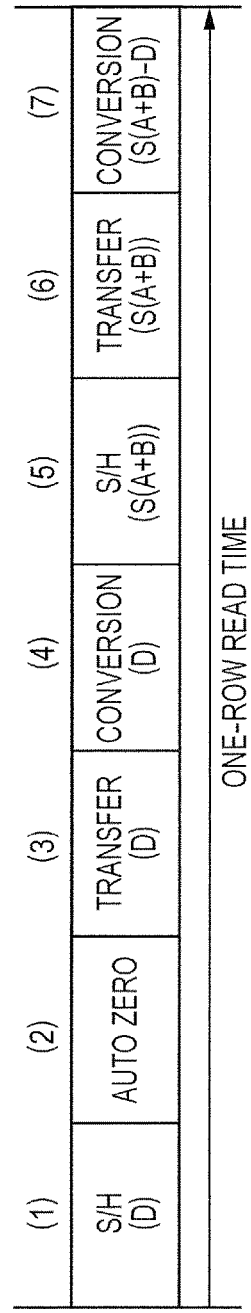
FIG. 9 is a diagram illustrating an operation sequence of an ADC at the time of shooting a still picture without focus detection.

FIG. 9 is a diagram illustrating an operation sequence of the ADC 7 at the time of shooting a still picture without focus detection.

As illustrated in FIG. 9, the operations are executed in the order of a phase (1) of sampling/holding the dark signal D, a phase (2) of transferring the dark signal D to the comparators L_CMP, C_CMP, and R_CMP, an auto zero phase (3) of the comparators L_CMP, C_CMP, and R_CMP, a conversion phase (4) of the dark signals D by the comparators L_CMP, C_CMP, and R_CMP, and a phase (5) of sampling/holding the synthesized signal S (A+B), a phase (6) of transferring the synthesized signal S (A+B) to the comparators L_CMP, C_CMP, and R_CMP, and a conversion phase (7) of "synthesized signal S(A+B)−dark signal D" by the comparators L_CMP, C_CMP, and R_CMP.

Next, referring to FIG. 7, the operation of the ADC 7 will be described.

(1) Phase of Sampling/Holding Dark Signal

The control circuit 98 sets only the switches L_S6, C_S6, and R_S6 to "on" and sets the other switches included in the ADCs 7L, 7C, and 7R to "off". As a result, the dark signal DL from the L pixel is held in the capacitor L_C4. The dark signal DC from the C pixel is held in the capacitor C_C4. The dark signal DR from the R pixel is held in the capacitor R_C4.

(2) Dark Signal Transfer Phase

Next, the control circuit 98 sets the switches L_S9, C_S9, R_S9, L_S2 to L_S4, C_S2 to C_S4, and R_S2 to R_S4 to "on". By the setting, the dark signal DL from the L pixel held in the capacitor L_C4 is transferred to the capacitors L_C1, L_C2, and L_C3 via the buffer L_BF. The dark signal DC from the C pixel held in the capacitor C_C4 is transferred to the capacitors C_C1, C_C2, and C_C3 via the buffer C_BF. The dark signal DR from the R pixel held in the capacitor R_C4 is transferred to the capacitors R_C1, R_C2, and R_C3 via the buffer R_BF.

(3) Auto Zero Phase

The control circuit 98 turns on the switch L_C to execute auto zero of the comparator L_CMP, turns on the switch C_C to execute auto zero of the comparator C_CMP, and turns on the switch R_C to execute auto zero of the comparator R_CMP. By the auto zero operations, the comparators L_CMP, C_CMP, and R_CMP operate at optimum operation points.

(4) Dark Signal Conversion Phase

The control circuit 98 resets the switches L_C, C_C, and R_C to "off".

The comparator L_CMP compares the voltage at the input node NDL with the reference voltage to convert a signal obtained by averaging the dark signals DL held in the capacitors L_C1, L_C2, and L_C3 to the digital signal DL*. The comparator C_CMP compares the voltage at the input node NDC with the reference voltage to convert a signal obtained by averaging the dark signals DC held in the capacitors C_C1, C_C2, and C_C3 to the digital signal DC*. The comparator R_CMP compares the voltage at the input node NDR with the reference voltage to convert a signal obtained by averaging the dark signals DR held in the capacitors R_C1, R_C2, and R_C3 to the digital signal DR*.

(5) Synthesized Signal Sampling/Holding Phase

The control circuit 98 sets only the switches L_S7, C_S7, and R_S7 to "on" and sets the other switches included in the ADC 7L, the ADC 7C, and the ADC 7R to "off". By the setting, the synthesized signal SL(A+B) from the L pixel is held in the capacitor L_C5. The synthesized signal SC(A+B) from the C pixel is held in the capacitor C_C5. The synthesized signal SR(A+B) from the R pixel is held in the capacitor R_C5.

(6) Synthesized Signal Transfer Phase

Subsequently, the control circuit 98 sets the switches L_S10, C_S10, R_S10, L_S2 to L_S4, C_S2 to C_S4, and R_S2 to R_S4 to "on".

By the setting, the synthesized signal SL(A+B) from the L pixel held in the capacitor L_C5 is transferred to the capacitors L_C1, L_C2, and L_C3 via the buffer L_BF, and the capacitors L_C1, L_C2, and L_C3 hold a signal SSL (=SL(A+B)−DL). The synthesized signal SC(A+B) from the C pixel held in the capacitor C_C5 is transferred to the capacitors C_C1, C_C2, and C_C3 via the buffer C_BF, and the capacitors C_C1, C_C2, and C_C3 hold a signal SSC (=SC(A+B)−DC). The synthesized signal SR(A+B) from the R pixel held in the capacitor R_C5 is transferred to the capacitors R_C1, R_C2, and R_C3 via the buffer R_BF, and the capacitors R_C1, R_C2, and R_C3 hold a signal SSR (=SR(A+B)−DR).

(7) Conversion Phase of "Synthesized Signal—Dark Signal"

The comparator L_CMP compares the voltage at the input node NDL with the reference voltage, thereby converting a signal obtained by averaging the signals SSL held in the capacitors L_C1, L_C2, and L_C3 to the digital signal SSL*. The comparator C_CMP compares the voltage at the input node NDC with the reference voltage, thereby converting a signal obtained by averaging the signals SSC held in the capacitors C_C1, C_C2, and C_C3 to the digital signal SSC*. The comparator R_CMP compares the voltage at the input node NDR with the reference voltage, thereby converting a signal obtained by averaging the signals SSR held in the capacitors R_C1, R_C2, and R_C3 to the digital signal SSR*.

(B) Operation at the Time of Shooting Still Picture with Focus Detection

Figure 10:
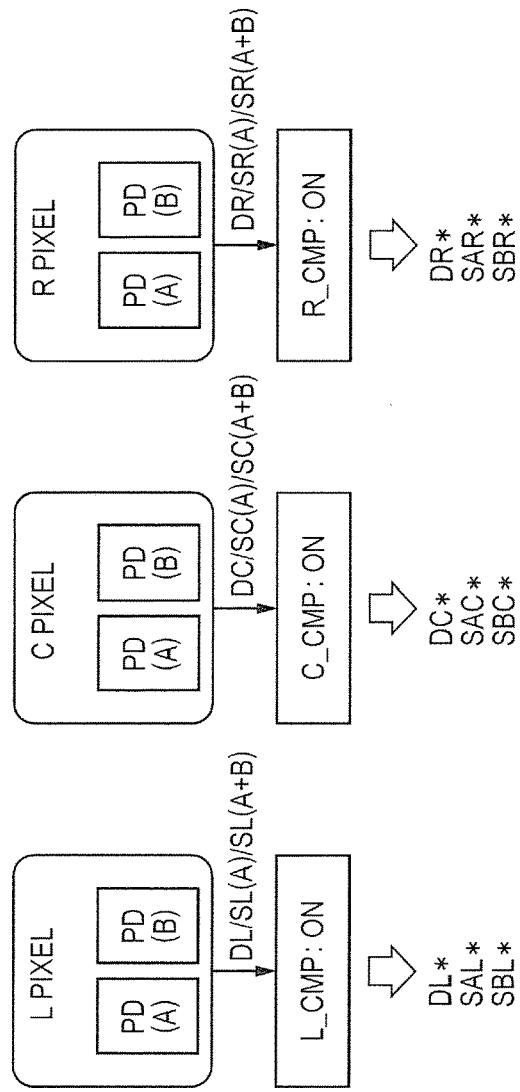
FIG. 10 is a diagram for explaining operations of pixels and ADCs at the time of shooting a still picture with focus detection.

FIG. 10 is a diagram for explaining operations of the pixels 8 and the ADCs 7 at the time of shooting a still picture with focus detection.

The control circuit 98 sets the comparator L_CMP in the ADC 7, the comparator C_CMP in the ADC 7, and the comparator R_CMP in the ADC 7R to "on".

First, the dark signal DL is output from the L pixel to the comparator L_CMP. Simultaneously, the dark signal DC is output from the C pixel to the comparator C_CMP and the dark signal DR is output from the R pixel to the comparator R_CMP. The comparators L_CMP, C_CMP, and R_CMP execute the auto zero operation. After that, the comparators L_CMP, C_CMP, and R_CMP AD-convert the dark signals DL, DC, and DR and output digital signals DL*, DC*, and DR*, respectively.

Next, an output signal SL(A) of the photodiode PD (A) is output from the L pixel is output to the comparator L_CMP. Simultaneously, an output signal SC(A) of the photodiode PD (A) is output from the C pixel to the comparator C_CMP, and an output signal SR(A) of the photodiode PD (A) is output from the R pixel to the comparator R_CMP.

The comparator L_CMP AD-converts the difference SAL{=SL(A)−DL} and outputs a digital signal SAL*. The digital signal SAL* expresses a signal output from the photodiode PD(A) of the pixel L. The comparator C_CMP AD-converts the difference SAC{=SC(A)−DC} and outputs a digital signal SAC*. The digital signal SAC* expresses a signal output from the photodiode PD(A) of the pixel C. The comparator R_CMP AD-converts the difference SAR{=SR (A)−DR} and outputs a digital signal SAR*. The digital signal SAR* expresses a signal output from the photodiode PD(A) of the pixel R.

Next, the synthesized signal SL(A+B) of the output of the photodiode PD(A) and the output of the photodiode PD(B) from the L pixel is output to the comparator L_CMP. Simultaneously, the synthesized signal SC(A+B) of the output of the photodiode PD(A) and the output of the photodiode PD(B) from the C pixel is output to the comparator C_CMP, and the synthesized signal SR(A+B) of the output of the photodiode PD(A) and the output of the photodiode PD(B) from the R pixel is output to the comparator R_CMP.

The comparator L_CMP AD-converts the difference SBL{=SL(A+B)−SL(A)} and outputs a digital signal SBL*. The digital signal SBL* expresses a signal output from the photodiode PD(B) of the pixel L. The comparator C_CMP AD-converts the difference SBC{=SC(A+B)−SC(A)} and outputs a digital signal SBC*. The digital signal SBC* expresses a signal output from the photodiode PD(B) of the pixel C. The comparator R_CMP AD-converts the difference SBR{=SR(A+B)−SR(A)} and outputs a digital signal SBR*. The digital signal SBR* expresses a signal output from the photodiode PD(B) of the pixel R.

The digital signal processing circuit 4 obtains the signal of the photodiode PD(A) and the signal of the photodiode PD(B) of the pixel L from which variations of the elements are eliminated by arithmetic operation of SAL*−DL* and SBL*−DL*. The digital signal processing circuit 4 obtains the signal of the photodiode PD(A) and the signal of the photodiode PD(B) of the pixel C from which variations of the elements are eliminated by arithmetic operation of SAC*−DC* and SBC*−DC*. The digital signal processing circuit 4 obtains the signal of the photodiode PD (A) and the signal of the photodiode PD(B) of the pixel R from which variations of the elements are eliminated by arithmetic operation of SAR*−DR* and SBR*−DR*.

Figure 11:
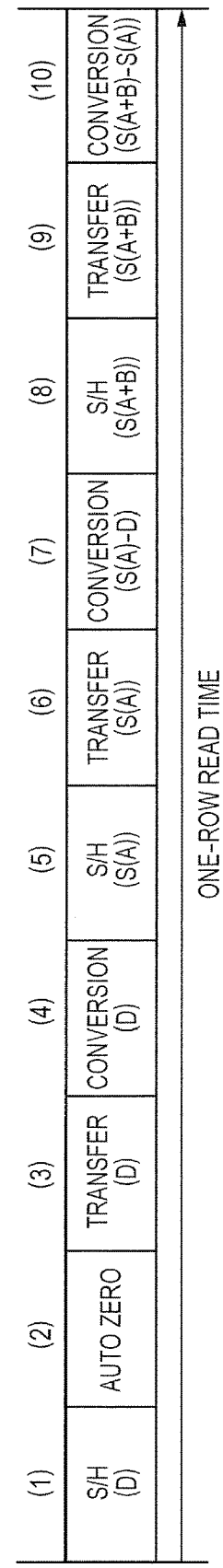
FIG. 11 is a diagram illustrating an operation sequence of an ADC at the time of shooting a still picture with focus detection.

FIG. 11 is a diagram illustrating an operation sequence of the ADC 7 at the time of shooting a still picture with focus detection.

As illustrated in FIG. 11, the operations are executed in the order of a phase (1) of sampling/holding the dark signal D, an auto zero phase (2) of the comparators L_CMP, C_CMP, and R_CMP, a phase (3) of transferring the dark signal D to the comparators L_CMP, C_CMP, and R_CMP, and a conversion phase (4) of the dark signals D by the comparators L_CMP, C_CMP, and R_CMP. Further, the operations are executed in the order of a phase (5) of sampling/holding the signal S(A) of the photodiode PD(A), a phase (6) of transferring the signal S(A) of the photodiode PD(A) to the comparators L_CMP, C_CMP, and R_CMP, and a conversion phase (7) of "the signal S(A) of the photodiode PD(A)−the dark signal D" by the comparators L_CMP, C_CMP, and R_CMP. Further, the operations are executed in the order of a phase (8) of sampling/holding the synthesized signal S(A+B), a phase (9) of transferring the synthesized signal S(A+B) to the comparators L_CMP, C_CMP, and R_CMP, and a conversion phase (10) of "the synthesized signal S(A+B)−the signal S(A) of the photodiode PD(A)" by the comparators L_CMP, C_CMP, and R_CMP.

Next, referring to FIG. 7, the operations of the ADC 7L, the ADC 7C, and the ADC 7R will be described.

Since the operations in the dark signal sampling/holding phase (1), the transferring phase (2), the auto zero phase (3), and the dark signal conversion phase (4) are the same as those at the time of shooting a still picture without focus detection, the description will not be repeated.

(5) Phase of Sampling/Holding Signal of Photodiode PD(A)

The control circuit 98 sets only the switches L_S7, C_S7, and R_S7 to "on" and sets the other switches included in the ADCs 7L, 7C, and 7R to "off". As a result, the signal SL(A) of the photodiode PD(A) from the L pixel is held in the capacitor L_C5. The signal SC(A) of the photodiode PD(A) from the C pixel is held in the capacitor C_C5. The signal SR(A) of the photodiode PD(A) from the R pixel is held in the capacitor R_C5.

(6) Transfer Phase of Signal of Photodiode PD(A)

Next, the control circuit 98 sets the switches L_S10, C_S10, R_S10, L_S2 to L_S4, C_S2 to C_S4, and R_S2 to R_S4 to "on". By the setting, the signal SL(A) of the photodiode PD(A) from the L pixel held in the capacitor L_C5 is transferred to the capacitors L_C1, L_C2, and L_C3 via the buffer L_BF, and the capacitors L_C1, L_C2, and L_C3 hold the signal SAL (=SL(A)−DL). The signal SC(A) of the photodiode PD (A) from the C pixel held in the capacitor C_C5 is transferred to the capacitors C_C1, C_C2, and C_C3 via the buffer C_BF, and the capacitors C_C1, C_C2, and C_C3 hold the signal SAC(=SC(A)−DC). The signal SR(A) of the photodiode PD(A) from the R pixel held in the capacitor R_C5 is transferred to the capacitors R_C1, R_C2, and R_C3 via the buffer R_BF, and the capacitors R_C1, R_C2, and R_C3 hold the signal SAR(=SR(A)−DR).

(7) Conversion Phase of "Signal of Photodiode PD(A)−Dark Signal"

The comparator L_CMP compares the voltage at the input node NDL with the reference voltage to convert a signal obtained by averaging the signals SAL held in the capacitors L_C1, L_C2, and L_C3 to the digital signal SAL*. The comparator C_CMP compares the voltage at the input node NDC with the reference voltage to convert a signal obtained by averaging the signals SAC held in the capacitors C_C1, C_C2, and C_C3 to the digital signal SAC*. The comparator R_CMP compares the voltage at the input node NDR with the reference voltage to convert a signal obtained by averaging the signals SAR held in the capacitors R_C1, R_C2, and R_C3 to the digital signal SAR*.

(8) Synthesized Signal Sampling/Holding Phase

The control circuit 98 sets only the switches L_S8, C_S8, and R_S8 to "on" and sets the other switches included in the ADC 7L, the ADC 7C, and the ADC 7R to "off". By the setting, the synthesized signal SL(A+B) from the L pixel is held in the capacitor L_C6. The synthesized signal SC(A+B) from the C pixel is held in the capacitor C_C6. The synthesized signal SR(A+B) from the R pixel is held in the capacitor R_C6.

(6) Synthesized Signal Transfer Phase

Subsequently, the control circuit 98 sets the switches L_S11, C_S11, R_S11, L_S2 to L_S4, C_S2 to C_S4, and R_S2 to R_S4 to "on".

By the setting, the synthesized signal SL(A+B) from the L pixel held in the capacitor L_C6 is transferred to the capacitors L_C1, L_C2, and L_C3 via the buffer L_BF, and the capacitors L_C1, L_C2, and L_C3 hold a signal SBL (=SL(A+B)−SL(A)). The synthesized signal SC(A+B) from the C pixel held in the capacitor C_C6 is transferred to the capacitors C_C1, C_C2, and C_C3 via the buffer C_BF, and the capacitors C_C1, C_C2, and C_C3 hold a signal SBC (=SC(A+B)−SC(A)). The synthesized signal SR(A+B) from the R pixel held in the capacitor R_C6 is transferred to the capacitors R_C1, R_C2, and R_C3 via the buffer R_BF, and the capacitors R_C1, R_C2, and R_C3 hold a signal SBR (=SR(A+B)−SR(A)).

(10) Conversion Phase of "Synthesized Signal–Signal of Photodiode PD(A)"

The comparator L_CMP compares the voltage at the input node NDL with the reference voltage, thereby converting a signal obtained by averaging the signals SBL held in the capacitors L_C1, L_C2, and L_C3 to the digital signal SBL*. The comparator C_CMP compares the voltage at the input node NDC with the reference voltage, thereby converting a signal obtained by averaging the signals SBC held in the capacitors C_C1, C_C2, and C_C3 to the digital signal SBC*. The comparator R_CMP compares the voltage at the input node NDR with the reference voltage, thereby converting a signal obtained by averaging the signals SBR held in the capacitors R_C1, R_C2, and R_C3 to the digital signal SBR*.

(C) Operations at the Time of Shooting Moving Picture without Focus Detection

Figure 12:
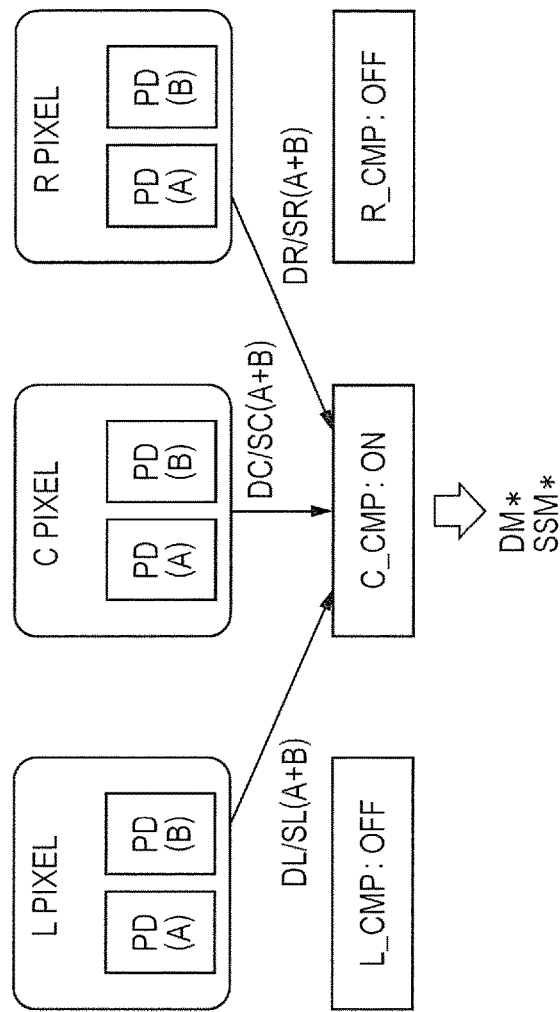
FIG. 12 is a diagram for explaining operations of pixels and ADCs at the time of shooting a still picture without focus detection.

FIG. 12 is a diagram for explaining operations of the pixels 8 and the ADCs 7 at the time of shooting a moving picture without focus detection. The comparator C_CMP in the ADC 7 is set to "on".

First, the dark signal DL is output from the L pixel to the comparator C_CMP. Simultaneously, the dark signal DC is output from the C pixel to the comparator C_CMP and the dark signal DR is output from the R pixel to the comparator C_CMP. The comparator C_CMP executes the auto zero operation. The comparator C_CMP AD-converts a signal obtained by averaging the dark signals DL, DC, and DR and outputs the digital signal DM*.

Next, a synthesized signal SL(A+B) of the output of the photodiode PD(A) and the output of the photodiode PD(B) from the L pixel is output to the comparator C_CMP. Simultaneously, a synthesized signal SC(A+B) of the output of the photodiode PD(A) and the output of the photodiode PD(B) from the C pixel is output to the comparator C_CMP, and a synthesized signal SR(A+B) of the output of the photodiode PD(A) and the output of the photodiode PD(B) from the R pixel is output to the comparator C_CMP.

The comparator C_CMP AD-converts a signal obtained by averaging the differences SSL{=SL(A+B)−DL}, SSC{=SC(A+B)−DC}, and SSR{=SR(A+B)−DR} and outputs a digital signal SSM*. The digital signal SSM* expresses an average of a signal obtained by synthesizing a signal output from the photodiode PD (A) and a signal output from the photodiode PD(B) of the pixel L, a signal obtained by synthesizing a signal output from the photodiode PD(A) and a signal output from the photodiode PD (B) of the pixel C, and a signal obtained by synthesizing a signal output from the photodiode PD (A) and a signal output from the photodiode PD(B) of the pixel R.

The digital signal processing circuit 4 obtains a synthesized signal from which variations of the elements are eliminated by arithmetic operation of SSM*–DM*.

Figure 13:
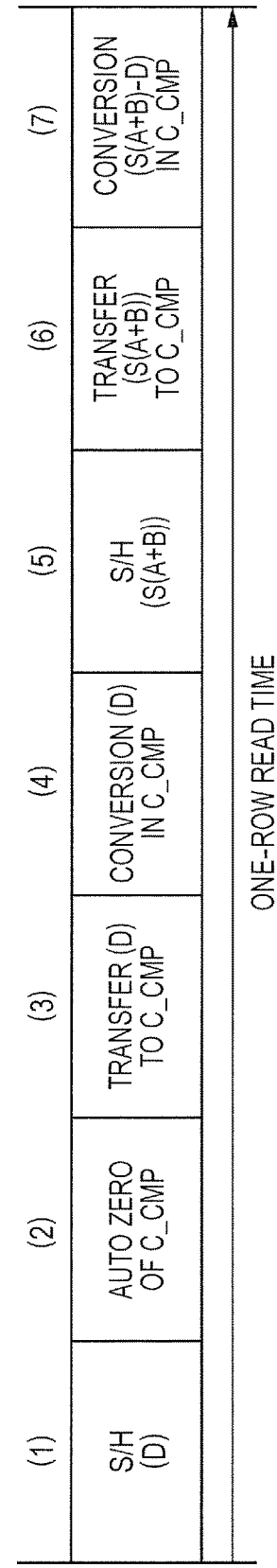
FIG. 13 is a diagram illustrating an operation sequence of an ADC at the time of shooting a moving picture without focus detection.

FIG. 13 is a diagram illustrating an operation sequence of the ADC 7 at the time of shooting a moving picture without focus detection.

As illustrated in FIG. 13, the operations are executed in the order of a phase (1) of sampling/holding the dark signal D, a phase (2) of transferring the dark signal D, an auto zero phase (3) of the comparator C_CMP, and a conversion phase (4) of the dark signal D by the comparator C_CMP. Further, the operations are executed in order of a phase (5) of sampling/holding the synthesized signal S(A+B), a phase (6) of transferring the synthesized signal S(A+B), and a conversion phase (7) of "synthesized signal S(A+B)–dark signal D" by the comparator C_CMP.

Next, referring to FIG. 7, the operation of the ADC 7 will be described.

(1) Phase of Sampling/Holding Dark Signal

The control circuit 98 sets only the switches L_S6, C_S6, and R_S6 to "on" and sets the other switches included in the ADCs 7L, 7C, and 7R to "off". As a result, the dark signal DL from the L pixel is held in the capacitor L_C4. The dark signal DC from the C pixel is held in the capacitor C_C4. The dark signal DR from the R pixel is held in the capacitor R_C4.

Since the operation of "Phase (1) of Sampling/Holding Dark Signal" is the same as that at the time of shooting a still picture without focus detection, the description will not be repeated.

(2) Auto Zero Phase of Comparator C_CMP

Next, the control circuit 98 turns on the switch C_C to execute auto zero of the comparator C_CMP.

(3) Dark Signal Transfer Phase

The control circuit 98 sets the switches L_S9, C_S9, R_S9, C_S1, C_S3, and C_S5 to "on". By the setting, the dark signal DL from the L pixel held in the capacitor L_C4 is transferred to the capacitor C_C1 via the buffer L_BF. The dark signal DC from the C pixel held in the capacitor C_C4 is held in the capacitor C_C2 via the buffer C_BF. The dark signal DR from the R pixel held in the capacitor R_C4 is held in the capacitor C_C3 via the buffer R_BF.

(4) Dark Signal Conversion Phase

The control circuit 98 resets the switch C_C to "off". The comparator C_CMP compares the voltage at the input node NDC with reference voltage, thereby converting a signal obtained by averaging the dark signals DL, DC, and DR held in the capacitors C_C1, C_C2, and C_C3, respectively to a digital signal DM*.

Since the operation of "Phase (5) of Sampling/Holding Synthesized Signal" is the same as that at the time of shooting a still picture without focus detection, the description will not be repeated.

(6) Transfer Phase of Synthesized Signal

Next, the control circuit 98 sets the switches L_S10, C_S10, R_S10, C_S1, C_S3, and C_S5 to "on". By the setting, the synthesized signal SL(A+B) from the L pixel held in the capacitor L_C5 is transferred to the capacitor L_C1 via the buffer L_BF, and the capacitor L_C1 holds the signal SSL(=SL(A+B)−DL). The synthesized signal SC(A+B) from the C pixel held in the capacitor C_C5 is transferred to the capacitor C_C2 via the buffer C_BF, and the capacitor C_C2 holds the signal SSC(=SC(A+B)−DC). The synthesized signal SR(A+B) from the R pixel held in the capacitor R_C5 is transferred to the capacitor C_C3 via the buffer R_BF, and the capacitor C_C3 holds the signal SSR(=SR(A+B)−DR).

(7) Conversion Phase of "Synthesized Signal–Dark Signal"

The comparator C_CMP compares the voltage at the input node NDL with the reference voltage to convert a signal obtained by averaging the signals SSL, SSC, and SSR held in the capacitors C_C1, C_C2, and C_C3 to the digital signal SSM*.

(D) Operations at the Time of Shooting Moving Picture with Focus Detection

Figure 14:
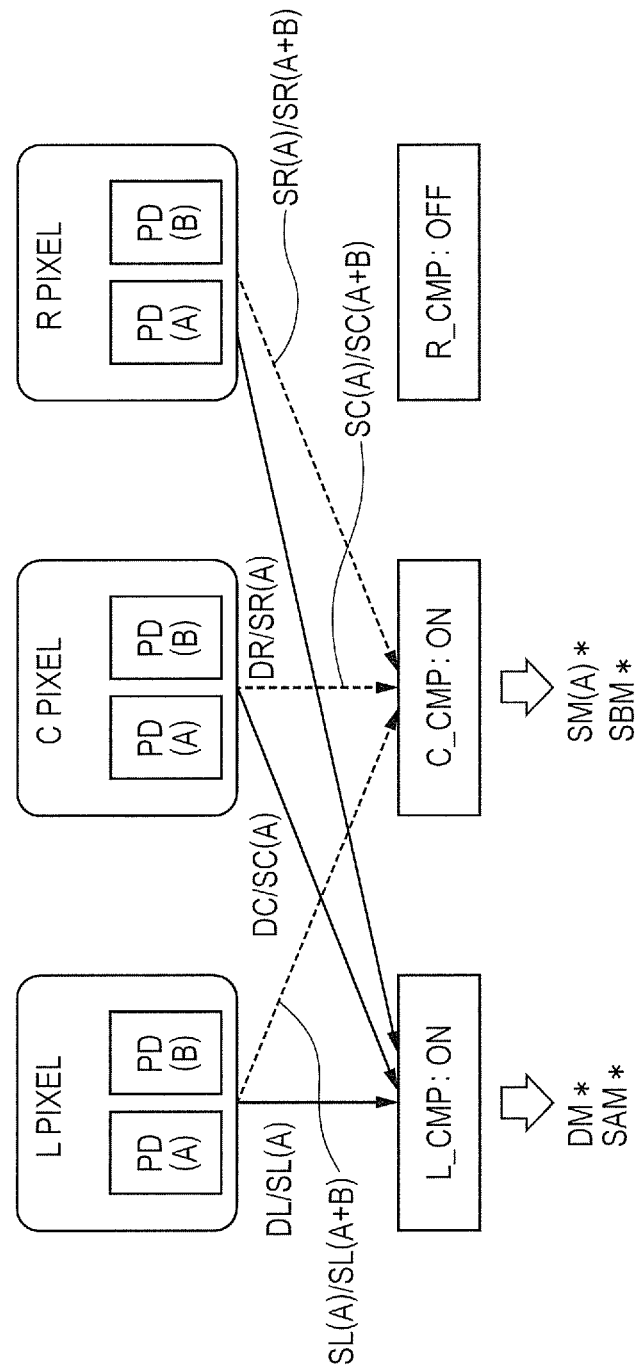
FIG. 14 is a diagram for explaining operations of pixels and ADCs at the time of shooting a moving picture with focus detection.

FIG. 14 is a diagram for explaining operations of the pixels 8 and the ADCs 7 at the time of shooting a moving picture with focus detection.

The control circuit 98 sets the comparator L_CMP in the ADC 7L and the comparator C_CMP in the ADC 7C to "on".

First, the dark signal DL is output from the L pixel to the comparator L_CMP. Simultaneously, the dark signal DC is output from the C pixel to the comparator L_CMP and the dark signal DR is output from the R pixel to the comparator L_CMP. The comparator L_CMP executes the auto zero operation. The comparator L_CMP AD-converts a signal obtained by averaging the dark signals DL, DC, and DR and outputs the digital signal DM*.

Next, the output signal SL(A) of the photodiode PD(A) is output from the L pixel to the comparators L_CMP and C_CMP. Simultaneously, the output signal SC(A) of the photodiode PD(A) is output from the C pixel to the comparators L_CMP and C_CMP, and the output signal SR(A) of the photodiode PD(A) is output from the R pixel to the comparators L_CMP and C_CMP.

The comparator L_CMP AD-converts a signal obtained by averaging the difference SAL{=SL(A)−DL}, SAC{=SC(A)−DC}, and SAR{=SR(A)−DR} and outputs a digital signal SAM*. The comparator C_CMP executes the auto zero operation. The comparator C_CMP AD-converts a signal obtained by averaging SL(A), SC(A), and SR(A) and outputs a digital signal SM(A)*.

Next, the synthesized signal SL(A+B) of the output of the photodiode PD(A) and the output of the photodiode PD(B) is output from the L pixel to the comparator C_CMP. Simultaneously, the synthesized signal SC(A+B) of the output of the photodiode PD(A) and the output of the photodiode PD(B) is output from the C pixel to the comparator C_CMP, and the synthesized signal SR(A+B) of the output of the photodiode PD(A) and the output of the photodiode PD(B) is output from the R pixel to the comparator C_CMP.

The comparator C_CMP AD-converts a signal obtained by averaging the differences SBL{=SL(A+B)−SL(A)}, SBC{=SC(A+B)−SC(A)}, and SBR{=SR(A+B)−SR(A)} and outputs a digital signal SBM*.

The digital signal processing circuit 4 obtains the averaged signal from which variations of the elements are eliminated by arithmetic operation of SAM*−DM*. The digital signal processing circuit 4 obtains the averaged signal from which variations of the elements are eliminated by arithmetic operation of SBM*−SM(A)*.

Figure 15:
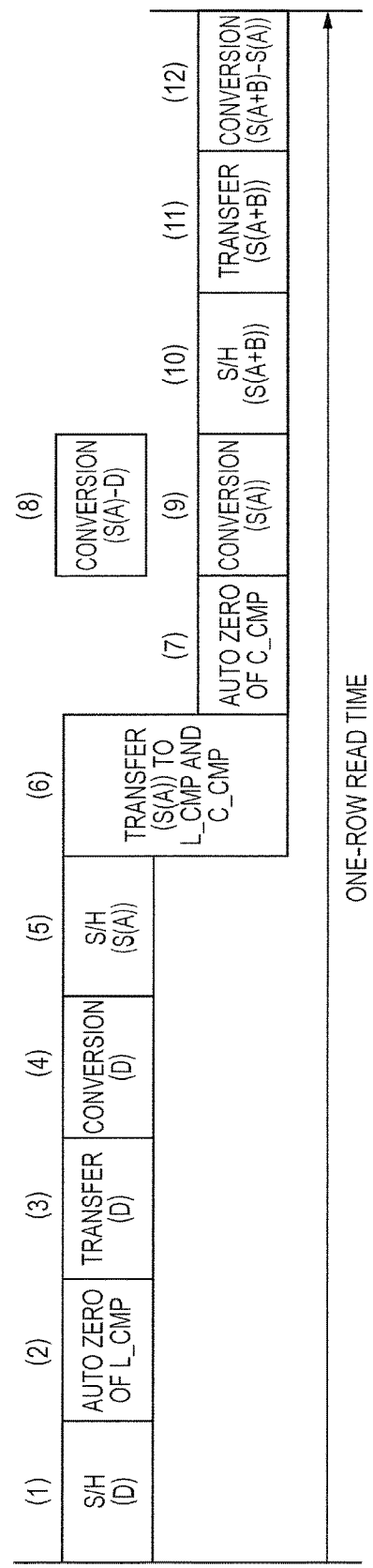
FIG. 15 is a diagram illustrating an operation sequence of an ADC at the time of shooting a moving picture with focus detection.

FIG. 15 is a diagram illustrating an operation sequence of the ADC 7 at the time of shooting a moving picture with focus detection.

As illustrated in FIG. 15, the operations are executed in order of a phase (1) of sampling/holding the dark signal D, a phase (2) of transferring the dark signal D to the comparator L_CMP, an auto zero phase (3) of the comparator L_CMP, and a conversion phase (4) of the dark signal D by the comparator L_CMP. Further, the operations are executed in order of a phase (5) of sampling/holding the signal S(A) of the photodiode PD(A) and a phase (6) of transferring the signal S(A) of the photodiode PD(A) to the comparators L_CMP and C_CMP. Further, the operations are executed in order of an auto zero phase (7) of the comparator C_CMP, a conversion phase (8) of "signal S(A) of photodiode PD(A)−dark signal D", and a conversion phase (9) of the signal S(A) of the photodiode PD(A). Further, the operations are executed in order of a phase (10) of sampling/holding the synthesized signal S(A+B), a phase (11) of transferring the synthesized signal S(A+B) to the comparator C_CMP, and a conversion phase (12) of "synthesized signal S(A+B)−signal S(A) of photodiode PD(A)".

Next, referring to FIG. 7, the operation of the ADC 7 will be described.

Since the operation of "Phase (1) of Sampling/Holding Dark Signal" is the same as that at the time of shooting a still picture without focus detection, the description will not be repeated.

(2) Dark Signal Transfer Phase

The control circuit 98 sets the switches L_S9, C_S9, R_S9, L_S1, L_S3, and L_S5 to "on". By the setting, the dark signal DL from the L pixel held in the capacitor L_C4 is transferred to the capacitor L_C1 via the buffer L_BF. The dark signal DC from the C pixel held in the capacitor C_C4 is held in the capacitor L_C2 via the buffer C_BF. The dark signal DR from the R pixel held in the capacitor R_C4 is held in the capacitor L_C3 via the buffer R_BF.

(3) Auto Zero Phase of Comparator L_CMP

Next, the control circuit 98 turns on the switch L_C to execute auto zero of the comparator L_CMP.

(4) Dark Signal Conversion Phase

The control circuit 98 resets the switch L_C to "off". The comparator L_CMP compares the voltage at the input node NDL with the reference voltage to convert a signal obtained by averaging the dark signals DL, DC, and DR held in the capacitors L_C1, L_C2, and L_C3, respectively, to the digital signal DM*.

(5) Phase of Sampling/Holding Signal of Photodiode PD(A)

The control circuit 98 sets only the switches L_S7, C_S7, and R_S7 to "on" and sets the other switches included in the ADC 7L, the ADC 7C, and the ADC 7R to "off". By the setting, the signal SL(A) of the photodiode PD(A) from the L pixel is held in the capacitor L_C5. The signal SC(A) of the photodiode PD(A) from the C pixel is held in the capacitor C_C5. The signal SR(A) of the photodiode PD(A) from the R pixel is held in the capacitor R_C5.

(6) Phase of Transferring Signal of Photodiode PD(A) to Comparators L_CMP and C_CMP Subsequently, the control circuit 98 sets the switches L_S10, C_S10, R_S10, L_S1, L_S3, L_S5, C_S1, C_S3, and C_S5 to "on".

By the setting, the signal SL(A) of the photodiode PD(A) from the L pixel held in the capacitor L_C5 is transferred to the capacitors L_C2 and C_C1 via the buffer L_BF. As a result, the capacitor L_C2 holds a signal SAL (=SL(A)−DL). The capacitor C_C1 holds the signal SL(A). The signal SC(A) of the photodiode PD(A) from the C pixel held in the capacitor C_C5 is transferred to the capacitors L_C1 and C_C2 via the buffer C_BF. As a result, the capacitor L_C1 holds a signal SAC(=SC(A)−DC). The capacitor C_C2 holds the signal SC(A). The signal SR(A) of the photodiode PD(A) from the R pixel held in the capacitor R_C5 is transferred to the capacitors L_C3 and C_C3 via the buffer R_BF. As a result, the capacitor L_C3 holds a signal SAR (=SR(A)−DR). The capacitor C_C3 holds the signal SC(A).

(7) Auto Zero Phase of Comparator C_CMP

Next, the control circuit 98 turns on the switch C_C to execute auto zero of the comparator C_CMP.

(8) Conversion Phase of "Signal of Photodiode PD(A)−Dark Signal"

The comparator L_CMP compares the voltage at the input node NDL with the reference voltage, thereby converting a signal obtained by averaging the signals SAL, SAC, and SAR held in the capacitors L_C1, L_C2, and L_C3, respectively, to the digital signal SAM*.

(9) Conversion Phase of Signal of Photodiode PD(A)

The control circuit 98 resets the switch L_C to "off". The comparator C_CMP compares the voltage at the input node NDL with the reference voltage to convert a signal obtained by averaging the signals SL(A), SC(A), and SR(A) held in the capacitors L_C1, L_C2, and L_C3, respectively, to the digital signal SM(A)*.

(10) Phase of Sampling/Holding Synthesized Signal

The control circuit 98 sets only the switches L_S8, C_S8, and R_S8 to "on" and sets the other switches included in the ADC 7L, the ADC 7C, and the ADC 7R to "off". By the setting, the synthesized signal SL(A+B) from the L pixel is held in the capacitor L_C6. The synthesized signal SC(A+B) from the C pixel is held in the capacitor C_C6. The synthesized signal SR(A+B) from the R pixel is held in the capacitor R_C6.

(11) Phase of Transferring Synthesized Signal to Comparator C_CMP

Subsequently, the control circuit 98 sets the switches L_S11, C_S11, R_S11, C_S1, C_S3, and C_S5 to "on". By the setting, the synthesized signal SL(A+B) from the L pixel held in the capacitor L_C6 is transferred to the capacitor C_C1 via the buffer L_BF, and the capacitor C_C1 holds the signal SBL(=SL(A+B)−SL(A)). The synthesized signal SC(A+B) from the C pixel held in the capacitor C_C6 is transferred to the capacitor C_C2 via the buffer C_BF, and the capacitor C_C2 holds the signal SBC(=SC(A+B)−SC(A)). The synthesized signal SR(A+B) from the R pixel held in the capacitor R_C6 is transferred to the capacitor C_C3 via the buffer R_BF, and the capacitor C_C3 holds the signal SBR(=SR(A+B)−SR(A)).

(12) Conversion Phase of "Synthesized Signal−Signal of Photodiode PD(A)"

The comparator C_CMP compares the voltage at the input node NDC with the reference voltage, thereby converting a signal obtained by averaging the signals SBL, SBC, and SCR held in the capacitors C_C1, C_C2, and C_C3, respectively, to the digital signal SBM*.

(E) Operations at the Time of Shooting Moving Picture with Focus Detection (Reference Example)

Figure 16:
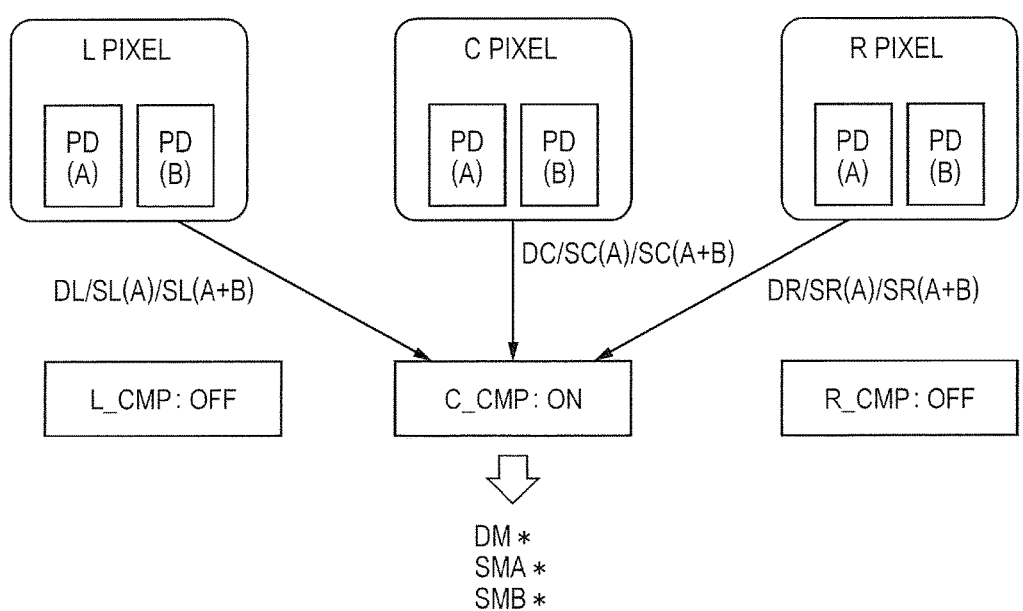
FIG. 16 is a diagram for explaining a reference example of operations of pixels and ADCs at the time of shooting a moving picture with focus detection.

FIG. 16 is a diagram for explaining a reference example of operations of the pixels 8 and the ADCs 7 at the time of shooting a moving picture with focus detection.

The control circuit 98 sets the comparator C_CMP in the ADC 7 to "on".

First, the dark signal DL is output from the L pixel to the comparator C_CMP. Simultaneously, the dark signal DC is output from the C pixel to the comparator C_CMP and the dark signal DR is output from the R pixel to the comparator C_CMP. The comparator C_CMP executes the auto zero operation. After that, the comparator C_CMP AD-converts a signal obtained by averaging the dark signals DL, DC, and DR and outputs the digital signal DM*.

Next, the output signal SL(A) of the photodiode PD(A) is output from the L pixel to the comparator C_CMP. Simultaneously, the output signal SC(A) of the photodiode PD(A) is output from the C pixel to the comparator C_CMP, and the output signal SR(A) of the photodiode PD(A) is output from the R pixel to the comparator C_CMP. The comparator C_CMP AD-converts a signal obtained by averaging the differences SAL{=SL(A)−DL}, SAC{=SC(A)−DC}, and SAR{=SR(A)−DR} and outputs the digital signal SAM*.

Subsequently, the synthesized signal SL(A+B) of the output of the photodiode PD(A) and the output of the photodiode PD(B) from the L pixel is output to the comparator C_CMP. Simultaneously, the synthesized signal SC(A+B) of the output of the photodiode PD(A) and the output of the photodiode PD(B) from the C pixel is output to the comparator C_CMP, and the synthesized signal SR(A+B) of the output of the photodiode PD(A) and the output of the photodiode PD(B) from the R pixel is output to the comparator C_CMP. The comparator C_CMP AD-converts a signal obtained by averaging the differences SBL{=SL(A+B)−SL(A)}, SBC{=SC(A+B)−SC(A)}, and SBR{=SR(A+B)−SR(A)} and outputs the digital signal SBM*.

The digital signal processing circuit 4 obtains an averaged signal from which variations of the elements are eliminated by arithmetic operation of SAM*−DM*. The digital signal processing circuit 4 obtains an averaged signal from which variations of the elements are eliminated by arithmetic operation of SBM*−SAM*.

There are the following different points between the reference example and the above-described method (D).

In the reference example, before SBM* is obtained, the comparator C_CMP does not execute the auto zero operation. In contrast, in the above-described method (D), before SBM* is obtained, the auto zero operation is executed. Therefore, the precision of the AD conversion in the method (D) is higher than that in the reference example.

As described above, according to the embodiment, particularly in the case of shooting a moving picture with focus detection, AD conversion can be executed with high precision.

Third Embodiment

Figure 17:
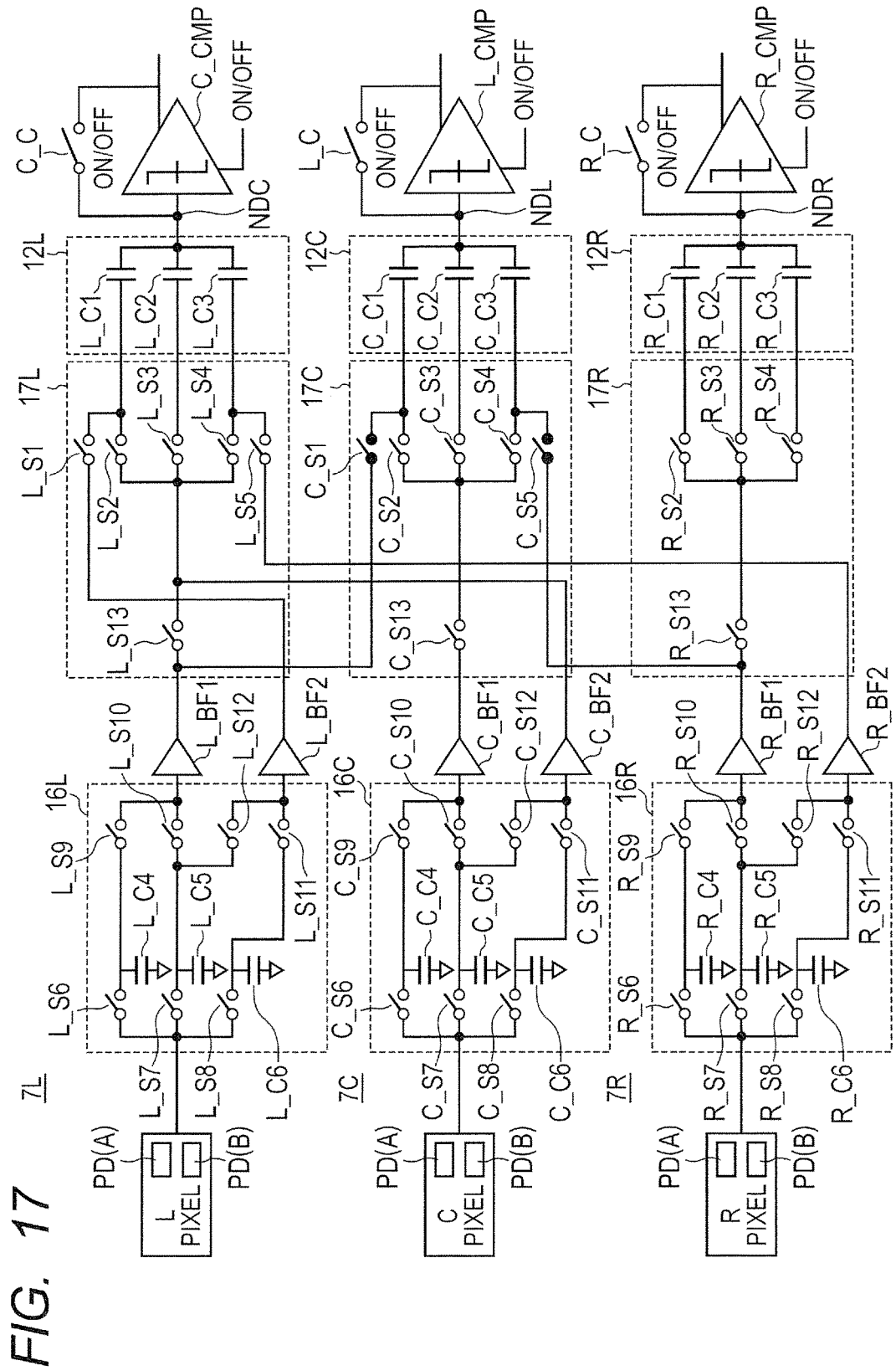
FIG. 17 is a diagram illustrating the configuration of ADCs of a third embodiment.

FIG. 17 is a diagram illustrating the configuration of the ADCs 7 of a third embodiment.

The different points of the ADCs 7 in FIG. 17 from the ADCs 7 in FIG. 7 are as follows.

A sample circuit 16L has a switch L_S12 in addition to the switches L_S6 to L_S11. The switch L_S12 is coupled to the switch L_S7 like the switch L_S10. A sample circuit 16C has a switch C_S12 in addition to the switches C_S6 to C_S11. The switch C_S12 is coupled to the switch C_S7 like the switch C_S10. A sample circuit 16R has a switch R_S12 in addition to the switches R_S6 to R_S11. The switch R_S12 is coupled to the switch R_S7 like the switch R_S10.

A buffer L_BF1 has inputs coupled to the switches L_S9 and L_S10 and outputs coupled to coupling switching circuits 17L and 17C. A buffer L_BF2 has inputs coupled to the switches L_S10 and L_S11 and outputs coupled to the coupling switching circuit 17L. A buffer C_BF1 has inputs coupled to the switches C_S9 and C_S10 and outputs coupled to the coupling switching circuit 17C. A buffer C_BF2 has inputs coupled to the switches C_S10 and C_S11 and an output coupled to the coupling switching circuit 17L. A buffer R_BF1 has inputs coupled to the switches R_S9 and R_S10 and outputs coupled to the coupling switching circuits 17C and 17R. A buffer R_BF2 has inputs coupled to the switches R_S10 and R_S11 and outputs coupled to the coupling switching circuit 17R.

The coupling switching circuit 17L enables an output of the buffer L_BF1, an output of the buffer L_BF2, an output of the buffer C_BF2, and an output of the buffer R_BF2 to be supplied to the input circuit 12L. The coupling switching circuit 17C enables an output of the buffer L_BF1, an output of the buffer C_BF1, an output of the buffer C_BF1, and an output of the buffer R_BF1 to be supplied to the input circuit 12C. The coupling switching circuit 17R enables an output of the bufferR_BF1 to be supplied to the input circuit 12R.

The coupling switching circuit 17L includes the switches L_S1 to L_S5 and a switch L_S13. The switch L_S13 is coupled to the output of the buffer L_BF1. The switch L_S1 is disposed between the output of the buffer L_BF2 and the capacitor L_C1. The switch L_S2 is disposed between the switch L_S13 and the capacitor L_C1. The switch L_S3 is disposed between the switch L_S13 and the capacitor L_C2. The switch L_S4 is disposed between the switch L_S13 and the capacitor L_C3. The switch L_S5 is disposed between the output of the buffer R_BF2 and the capacitor L_C3.

The coupling switching circuit 17C includes the switches C_S1 to C_S5 and a switch C_S13. The switch C_S13 is coupled to the output of the buffer C_BF1. The switch C_S1 is disposed between the output of the buffer L_BF1 and the capacitor C_C1. The switch C_S2 is disposed between the switch C_S13 and the capacitor C_C1. The switch C_S3 is disposed between the switch C_S13 and the capacitor C_C2. The switch C_S4 is disposed between the switch C_S13 and the capacitor C_C3. The switch C_S5 is disposed between the output of the buffer R_BF1 and the capacitor C_C3.

The coupling switching circuit 11R includes the switches R_S2 to R_S4 and a switch R_S13. The switch R_S13 is coupled to the output of the buffer R_BF1. The switch R_S2 is disposed between the switch R_S13 and the capacitor R_C1. The switch R_S3 is disposed between the switch R_S13 and the capacitor R_C2. The switch R_S4 is disposed between the switch R_S13 and the capacitor R_C3.

Different from the second embodiment, the capacitors L_C1, L_C2, and L_C3 in the input circuit 12L are coupled to the input node NDC of the comparator C_CMP. Different from the second embodiment, the capacitors C_C1, C_C2, and C_C3 in the input circuit 12C are coupled to the input node NDL of the comparator L_CMP. Different from the second embodiment, the capacitors R_C1, R_C2, and R_C3 in the input circuit 12R are coupled to the input node NDR of the comparator R_CMP.

(A) Operations at the Time of Shooting Still Picture without Focus Detection

Referring FIG. 17, the operations of the ADCs 7 will be described.

(1) Phase of Sampling/Holding Dark Signal

The control circuit 98 sets only the switches L_S6, C_S6, and R_S6 to "on" and sets the other switches included in the ADCs 7L, 7C, and 7R to "off". As a result, the dark signal DL from the L pixel is held in the capacitor L_C4. The dark signal DC from the C pixel is held in the capacitor C_C4. The dark signal DR from the R pixel is held in the capacitor R_C4.

(2) Dark Signal Transfer Phase

The control circuit 98 sets the switches L_S9, C_S9, R_S9, L_S2 to L_S4, C_S2 to C_S4, R_S2 to R_S4, L_S13, C_S13, and R_S13 to "on". By the setting, the dark signal DL from the L pixel held in the capacitor L_C4 is held in the capacitors L_C1, L_C2, and L_C3 via the buffer L_BF1. The dark signal DC from the C pixel held in the capacitor C_C4 is held in the capacitors C_C1, C_C2, and C_C3 via the buffer C_BF1. The dark signal DR from the R pixel held in the capacitor R_C4 is held in the capacitors R_C1, R_C2, and R_C3 via the buffer R_BF1.

(3) Auto Zero Phase

Next, the control circuit 98 turns on the switch L_C to execute auto zero of the comparator L_CMP, turns on the switch C_C to execute auto zero of the comparator C_CMP, and turns on the switch R_C to execute auto zero of the comparator R_CMP.

(4) Dark Signal Conversion Phase

The control circuit 98 resets the switches L_C, C_C, and R_C to "off". The comparator C_CMP compares the voltage at the input node NDC with reference voltage, thereby converting a signal obtained by averaging the dark signals DL held in the capacitors L_C1, L_C2, and L_C3 to a digital signal DL*. The comparator L_CMP compares the voltage at the input node NDC with reference voltage, thereby converting a signal obtained by averaging the dark signals DC held in the capacitors C_C1, C_C2, and C_C3 to a digital signal DC*. The comparator R_CMP compares the voltage at the input node NDC with reference voltage, thereby converting a signal obtained by averaging the dark signals DR held in the capacitors R_C1, R_C2, and R_C3 to a digital signal DR*.

(5) Synthesized Signal Sampling/Holding Phase

The control circuit 98 sets only the switches L_S7, C_S7, and R_S7 to "on" and sets the other switches included in the ADC 7L, the ADC 7C, and the ADC 7R to "off". By the setting, the synthesized signal SL(A+B) from the L pixel is held in the capacitor L_C5. The synthesized signal SC(A+B) from the C pixel is held in the capacitor C_C5. The synthesized signal SR(A+B) from the R pixel is held in the capacitor R_C5.

(6) Transfer Phase of Synthesized Signal

Next, the control circuit 98 sets the switches L_S10, C_S10, R_S10, L_S2 to L_S4, C_S2 to C_S4, R_S2 to R_S4, L_S13, C_S13, and R_S13 to "on". By the setting, the synthesized signal SL(A+B) from the L pixel held in the capacitor L_C5 is transferred to the capacitors L_C1, L_C2, and L_C3 via the buffer L_BF1, and the capacitors L_C1, L_C2, and L_C3 hold the signal SSL(=SL(A+B)−DL). The synthesized signal SC(A+B) from the C pixel held in the capacitor C_C5 is transferred to the capacitors C_C1, C_C2, and C_C3 via the buffer C_BF1, and the capacitors C_C1, C_C2, and C_C3 hold the signal SSC(=SC(A+B)−DC). The synthesized signal SR(A+B) from the R pixel held in the capacitor R_C5 is transferred to the capacitors R_C1, R_C2, and R_C3 via the buffer R_BF1, and the capacitors R_C1, R_C2, and R_C3 hold the signal SSR(=SR(A+B)−DR).

(7) Conversion Phase of "Synthesized Signal−Dark Signal"

The comparator C_CMP compares the voltage at the input node NDL with the reference voltage to convert a signal obtained by averaging the signals SSL held in the capacitors L_C1, L_C2, and L_C3 to the digital signal SSL*. The comparator L_CMP compares the voltage at the input node NDL with the reference voltage to convert a signal obtained by averaging the signals SSC held in the capacitors C_C1, C_C2, and C_C3 to the digital signal SSC*. The comparator R_CMP compares the voltage at the input node NDR with the reference voltage to convert a signal obtained by averaging the signals SSR held in the capacitors R_C1, R_C2, and R_C3 to the digital signal SSR*.

(E) Operations at the Time of Shooting Moving Picture with Focus Detection

Figure 18:
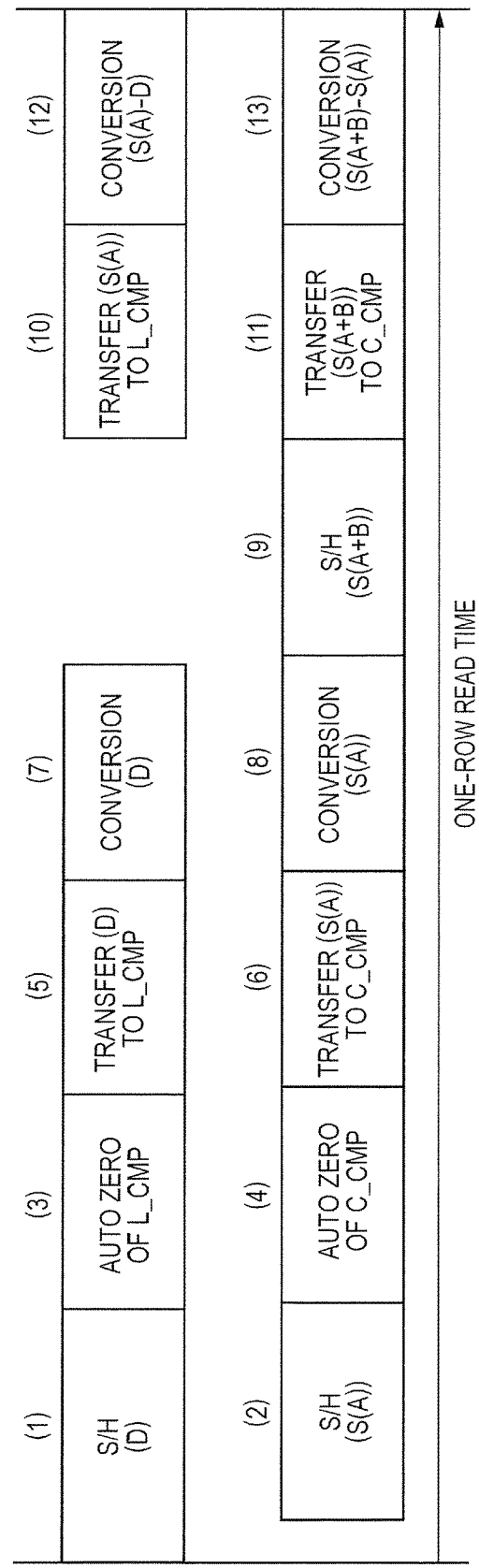
FIG. 18 is a diagram illustrating an operation sequence of the ADCs at the time of shooting a moving picture with focus detection of the third embodiment.

FIG. 18 is a diagram illustrating an operation sequence of the ADCs 7 at the time of shooting a moving picture with focus detection of a third embodiment.

As illustrated in FIG. 18, the operations are executed in order of a phase (1) of sampling/holding the dark signal D, a phase (2) of sampling/holding the signal of the photodiode PD(A), (3) a phase of transferring the dark signal to L_CMP, (4) a phase of transferring the signal of the photodiode PD(A) to C_CMP, and an auto zero phase (5) of L_CMP. Further, an auto zero phase (6) of C_CMP, a dark signal conversion phase (7), a phase (8) of converting the signal of the photodiode PD(A), a synthesized signal sampling/holding phase (9), and a phase (10) of transferring the signal of the photodiode PD(A) to L_CMP are executed. Further, a phase (11) of transferring the synthesized signal to C_CMP, a conversion phase (12) of "signal of photodiode PD (A)−dark signal", and a conversion phase (13) of "synthesized signal−signal of photodiode PD(A)" are executed.

The latter half of the phase (1) and the phase (2), the phases (3) and (4), the phases (5) and (6), the phases (7) and (8), the phases (10) and (11), and the phases (12) and (13) are performed in parallel.

Next, referring to FIG. 17, the operations of the ADCs 7 will be described.

(1) Phase of Sampling/Holding Dark Signal

The control circuit 98 sets only the switches L_S6, C_S6, and R_S6 to "on" and sets the other switches included in the ADCs 7L, 7C, and 7R to "off". As a result, the dark signal DL from the L pixel is held in the capacitor L_C4. The dark signal DC from the C pixel is held in the capacitor C_C4. The dark signal DR from the R pixel is held in the capacitor R_C4.

(2) Phase of Sampling/Holding Signal of Photodiode PD(A)

The control circuit 98 sets only the switches L_S7, C_S7, and R_S7 to "on" and sets the other switches included in the ADCs 7L, 7C, and 7R to "off". As a result, the signal SL(A) of the photodiode PD(A) from the L pixel is held in the capacitor L_C5. The signal SC(A) of the photodiode PD (A) from the C pixel is held in the capacitor C_C5. The signal SR(A) of the photodiode PD(A) from the R pixel is held in the capacitor R_C5.

(3) Phase of Transferring Dark Signal to L_CMP

The control circuit 98 sets only the switches L_S9, C_S9, R_S9, C_S1, C_S3, C_S5, and C_S13 to "on". By the setting, the dark signal DL from the L pixel held in the capacitor L_C4 is held in the capacitor C_C1 via the buffer L_BF1. The dark signal DC from the C pixel held in the capacitor C_C4 is held in the capacitor C_C2 via the buffer C_BF1. The dark signal DR from the R pixel held in the capacitor R_C4 is held in the capacitor C_C3 via the buffer R_BF1.

(4) Phase of Transferring Signal of Photodiode PD(A) to C_CMP

The control circuit 98 sets the switches L_S12, C_S12, R_S12, L_S1, L_S3, and L_S5 to "on".

By the setting, the signal SL(A) from the L pixel held in the capacitor L_C5 is held in the capacitor L_C1. The signal SC(A) from the C pixel held in the capacitor C_C5 is held in the capacitor L_C2. The signal SR(A) from the R pixel held in the capacitor R_C5 is held in the capacitor L_C3.

(5) Auto Zero Phase of L_CMP

Next, the control circuit 98 turns on the switch L_C to execute auto zero of the comparator L_CMP.

(6) Auto Zero Phase of C_CMP

Subsequently, the control circuit 98 turns on the switch C_C to execute auto zero of the comparator C_CMP.

(7) Dark Signal Conversion Phase

The control circuit 98 resets the switch C_C to "off". The comparator L_CMP compares the voltage at the input node NDC with reference voltage, thereby converting a signal obtained by averaging the dark signals DL, DC, and DR held in the capacitors C_C1, C_C2, and C_C3, respectively to a digital signal DM*.

(8) Conversion Phase of Signal of Photodiode PD(A)

The control circuit 98 resets the switch C_C to "off". The comparator C_CMP compares the voltage at the input node NDC with the reference voltage to convert a signal obtained by averaging the dark signals SL(A), SC(A), and SR(A) held in the capacitors L_C1, L_C2, and L_C3, respectively, to the digital signal SM(A).

(9) Phase of Sampling/Holding Synthesized Signal

The control circuit 98 sets only the switches L_S8, C_S8, and R_S8 to "on" and sets the other switches included in the ADC 7L, the ADC 7C, and the ADC 7R to "off". By the setting, the synthesized signal SL(A+B) from the L pixel is held in the capacitor L_C6. The synthesized signal SC(A+B) from the C pixel is held in the capacitor C_C6. The synthesized signal SR(A+B) from the R pixel is held in the capacitor R_C6.

(10) Phase of Transferring Signal of Photodiode PD(A) to L_CMP

Subsequently, the control circuit 98 sets the switches L_S10, C_S10, R_S10, L_S11, C_S11, R_S11, L_S1, L_S3, L_S5, C_S1, C_S3, C_S5, and C_S13 to "on". By the setting, the signal SL(A) of the photodiode PD(A) from the L pixel held in the capacitor L_C5 is transferred to the capacitor C_C1 via the buffer L_BF1. As a result, the capacitor C_C1 holds the signal SAL(=SL(A)−DL). The signal SC(A) of the photodiode PD (A) from the C pixel held in the capacitor C_C5 is transferred to the capacitor C_C2 via the buffer C_BF1. As a result, the capacitor C_C2 holds the signal SAC(=SC(A)−DC). The signal SR(A) of the photodiode PD(A) from the R pixel held in the capacitor R_C5 is transferred to the capacitor C_C3 via the buffer R_BF1. As a result, the capacitor C_C3 holds the signal SAR(=SR(A)−DR).

(11) Phase of Transferring Synthesized Signal to C_CMP

The synthesized signal SL(A+B) from the L pixel held in the capacitor L_C6 is transferred to the capacitor L_C1 via the buffer L_BF2. As a result, the capacitor L_C1 holds the signal SBL(=SL(A+B)−SL(A)). The synthesized signal SC(A+B) from the C pixel held in the capacitor C_C6 is transferred to the capacitor L_C2 via the buffer C_BF2, and the capacitor L_C2 holds the signal SBC(=SC(A+B)−SC(A)). The synthesized signal SR(A+B) from the R pixel held in the capacitor R_C6 is transferred to the capacitor C_C3 via the buffer R_BF2, and the capacitor L_C3 holds the signal SBR(=SR(A+B)−SR(A)).

(12) Conversion Phase of "Signal of Photodiode PD (A)−Dark Signal"

The comparator L_CMP compares the voltage at the input node NDL with the reference voltage, thereby converting a signal obtained by averaging the signals SAL, SAC, and SAR held in the capacitors C_C1, C_C2, and C_C3, respectively, to the digital signal SAM*.

(13) Conversion Phase of "Synthesized Signal-Signal of Photodiode PD(A)"

The comparator C_CMP compares the voltage at the input node NDC with the reference voltage, thereby converting a signal obtained by averaging the signals SBL, SBC, and SBR held in the capacitors L_C1, L_C2, and L_C3, respectively, to the digital signal SBM*.

As described above, according to the embodiment, two buffers are provided for each ADC, and two signals held can be simultaneously transferred to two comparators. Consequently, at the time of shooting a moving picture with focus detection, necessary data can be obtained at high speed.

Fourth Embodiment

In the second and third embodiments, to reduce variations in the elements, AD conversion of the dark signal and AD conversion of the photodiode PD(A) are executed. However, in the case where variations in the elements are ignorable, it is unnecessary to execute the AD conversion of the dark signal and the AD conversion of the photodiode PD(A).

Figure 19:
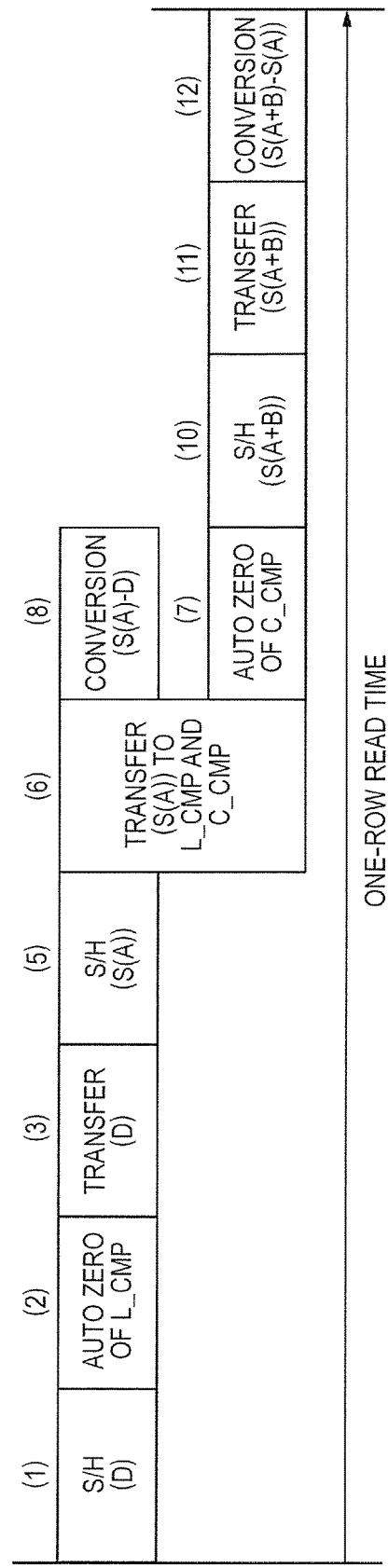
FIG. 19 is a diagram illustrating an operation sequence of the ADCs at the time of shooting a moving picture with focus detection of a fourth embodiment.

FIG. 19 is a diagram illustrating an operation sequence of the ADCs 7 at the time of shooting a moving picture with focus detection of a fourth embodiment.

In FIG. 19, the phase (4) of converting the dark signal D by the comparator L_CMP and the conversion phase (9) of the signal S(A) of the photodiode PD(A) which are included in FIG. 15 are not included. With the configuration, in the embodiment, speed higher than that in the second embodiment can be realized.

Fifth Embodiment

Figure 20:
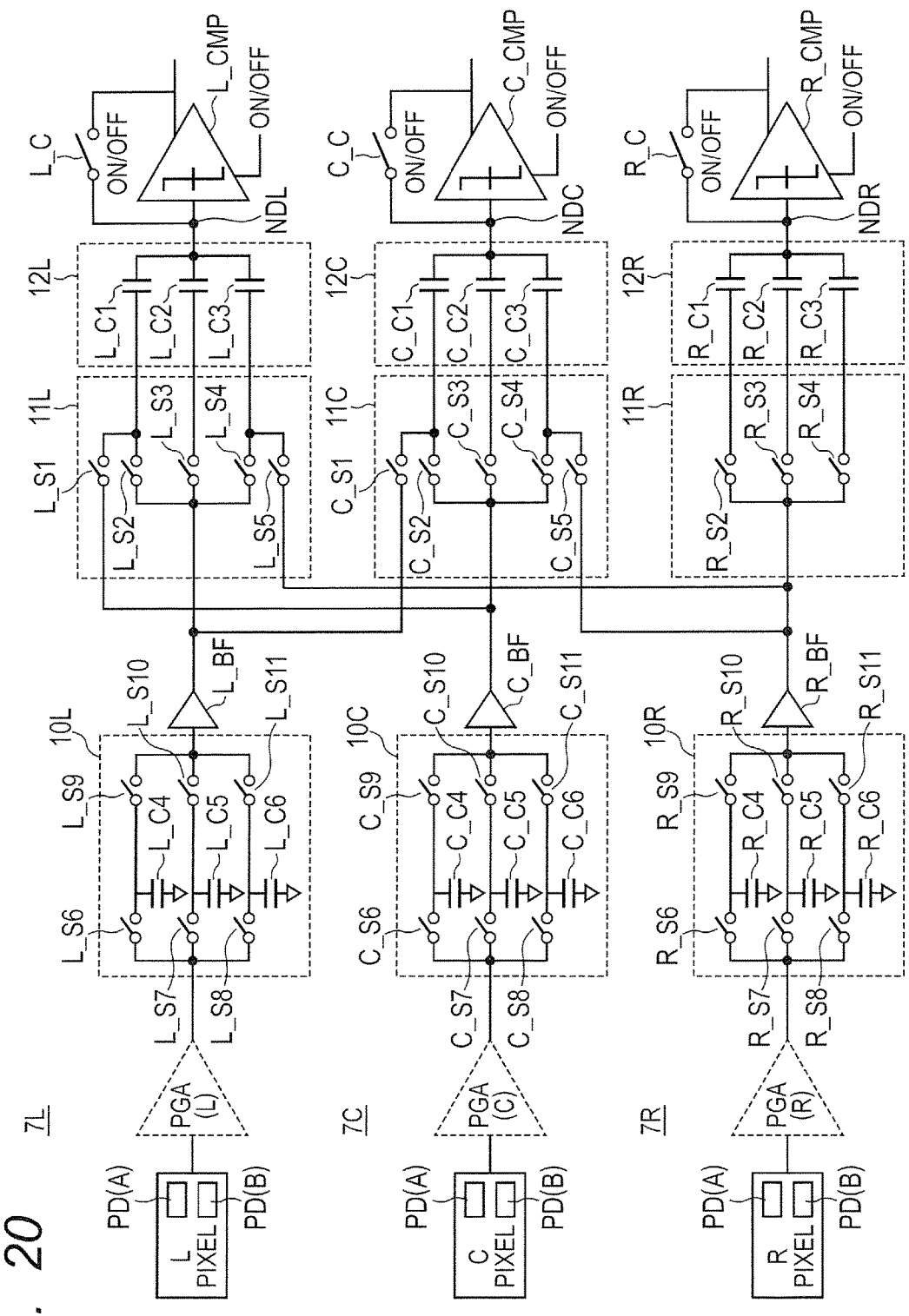
FIG. 20 is a diagram illustrating the configuration of ADCs of a fifth embodiment.

FIG. 20 is a diagram illustrating the configuration of the ADCs 7 of a fifth embodiment.

As illustrated in FIG. 20, the ADC 7L has PGA(L) at the front stage of the sample circuit 10L. The ADC 7C has PGA(C) at the front stage of the sample circuit 10C. The ADC 7R has PGA(R) at the front stage of the sample circuit 10R. With the configuration, a signal from a pixel is properly amplified.

First Modification of Fifth Embodiment

Figure 21:
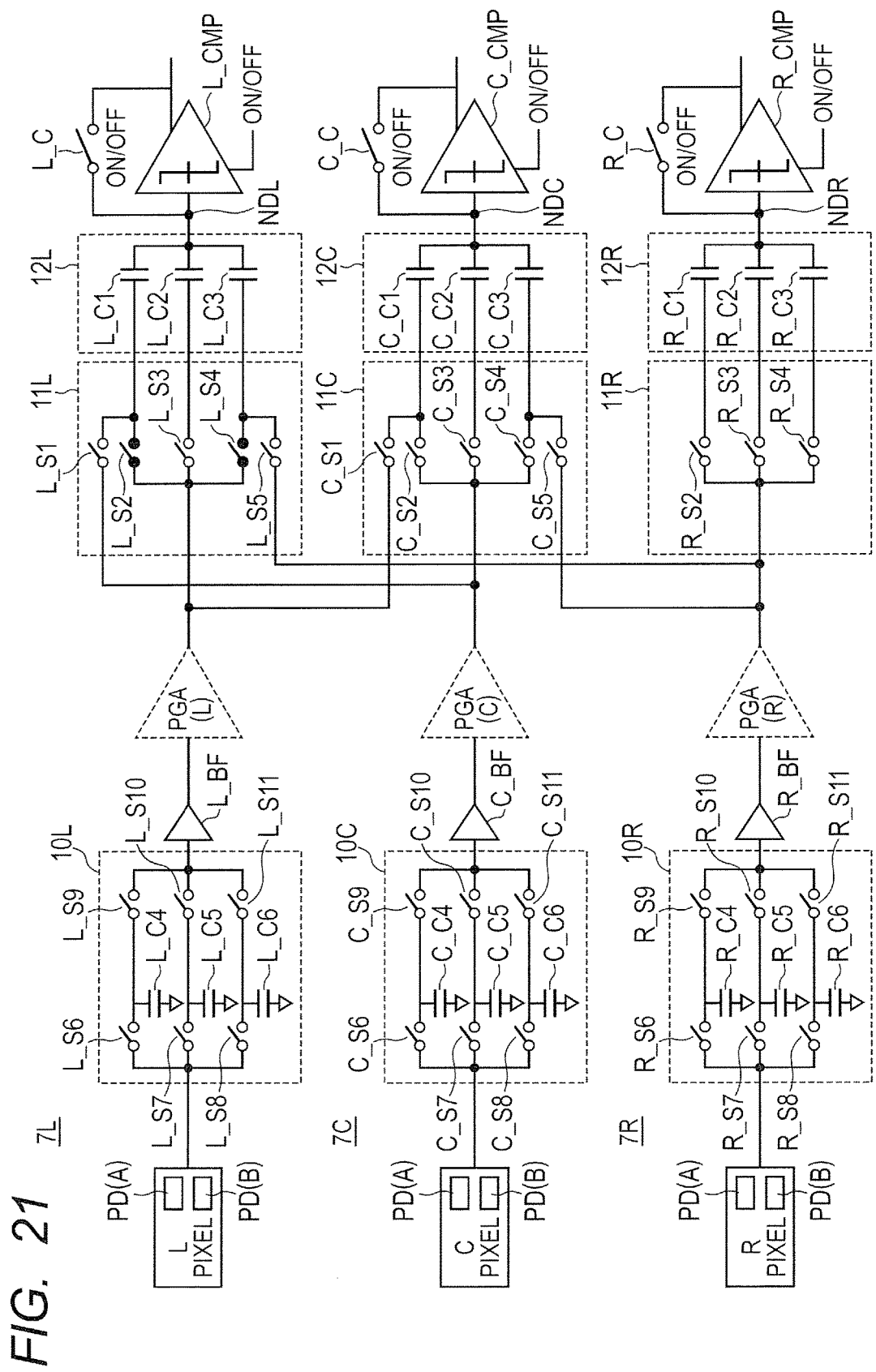
FIG. 21 is a diagram illustrating the configuration of ADCs of a first modification of the fifth embodiment.

FIG. 21 is a diagram illustrating the configuration of the ADCs 7 of a first modification of the fifth embodiment.

As illustrated in FIG. 21, the ADC 7L has PGA(L) at the rear stage of the buffer L_BF. The ADC 7C has PGA(C) at the rear stage of the buffer C_BF. The ADC 7R has PGA(R) at the rear stage of the buffer R_BF.

Second Modification of Fifth Embodiment

Figure 22:
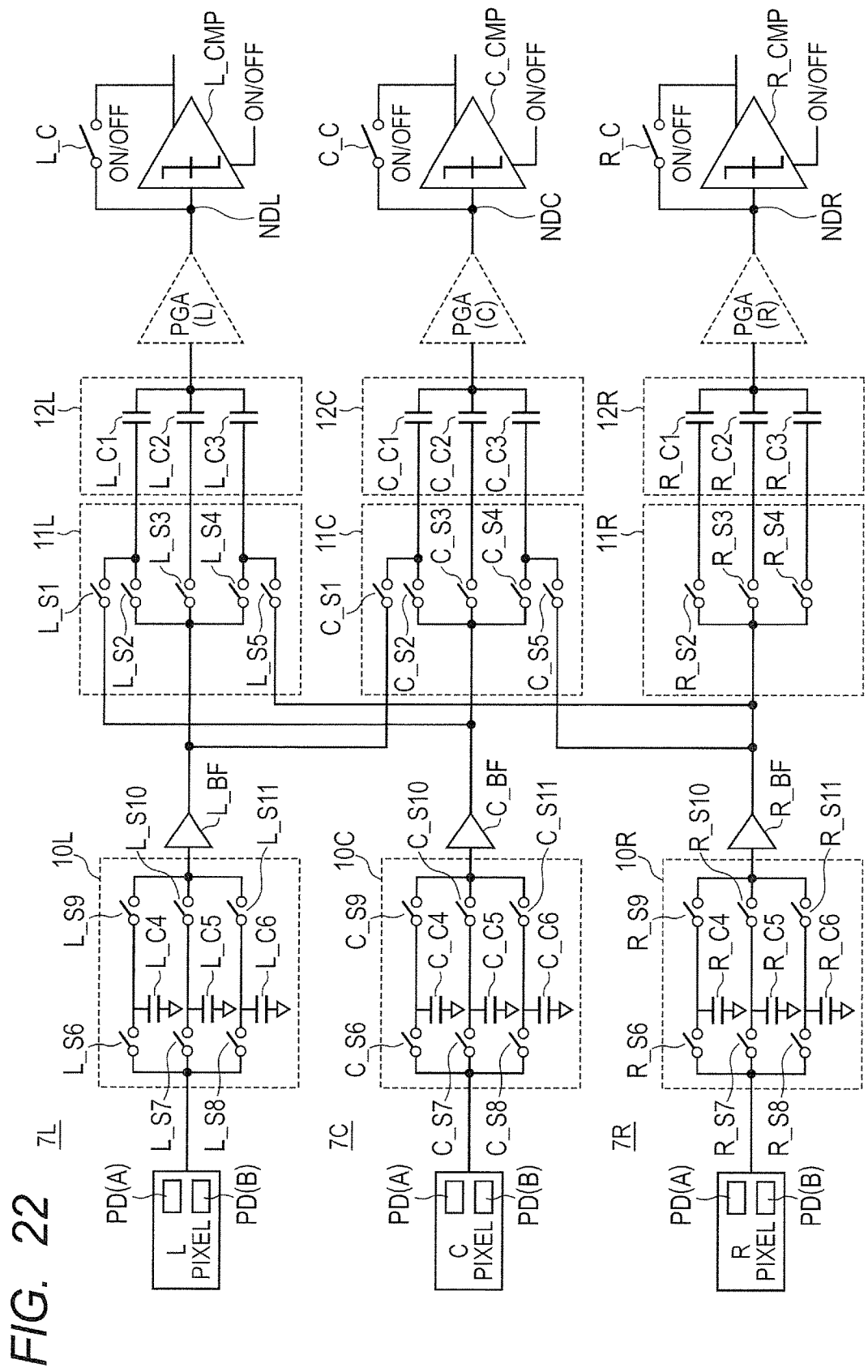
FIG. 22 is a diagram illustrating the configuration of ADCs of a second modification of the fifth embodiment.

FIG. 22 is a diagram illustrating the configuration of the ADCs 7 of a second modification of the fifth embodiment.

As illustrated in FIG. 22, the ADC 7L has PGA(L) at the front stage of the comparator L_CMP. The ADC 7C has PGA(C) at the front stage of the comparator C_CMP. The ADC 7R has PGA(R) at the front stage of the comparator R_CMP.

Modification

To reduce random noise, at the time of executing AD conversion on the difference, the AD conversion may be executed a plurality of times and an average is obtained.

The present invention achieved by the inventors herein has been concretely described above on the basis of the embodiments. Obviously, the present invention is not limited to the embodiments and can be variously changed without departing from the gist.

What is claimed is:

1. A semiconductor device comprising:
   a pixel array including a plurality of pixels arranged in a matrix, each pixel including a first switch and a second switch;
   a scanning circuit, in a first mode, enabling a first signal to be output from a pixel from among the plurality of pixels by setting the first and second switches to "off" in a period before a first timing, enabling a second signal to be output from the pixel by setting only the first switch to "on" for a predetermined period from the first timing, and enabling a third signal to be output from the pixel by setting the first and second switches to "on" for a predetermined period from a second timing after the first timing;
   a first AD (Analog/Digital) converter, in a second mode, capable of performing AD conversion by comparing the difference between the second signal and the first signal with a reference signal; and
   a second AD converter, in the second mode, performing AD conversion by comparing the difference between the third signal and the second signal with the reference signal,
   wherein the first AD converter further compares the first signal with the reference signal, and
   wherein the second AD converter further compares the second signal with the reference signal.

2. The semiconductor device according to claim 1, wherein the first mode comprises a case of shooting a picture with focus detection.

3. The semiconductor device according to claim 1, wherein the second mode comprises a case of shooting a moving picture with focus detection.

4. The semiconductor device according to claim 1, wherein each pixel of the plurality of pixels including a first photoelectric conversion element, a second photoelectric conversion element, a node, an output unit outputting voltage of the node to a data output line, the first switch between the first photoelectric conversion element and the node, and the second switch between the second photoelectric conversion element and the node.

5. A semiconductor device comprising:
   a pixel array including a plurality of pixels arranged in a matrix, each pixel including a first switch and a second switch;
   a scanning circuit, in a first mode, enabling a first signal to be output from a pixel from the plurality of pixels by setting the first and second switches to "off" in a period before a first timing, enabling a second signal to be output from the pixel by setting only the first switch to "on" for redetermined period from the first timing, and enabling a third signal to be output from the pixel by setting the first and second switches to "on" for a redetermined period from a second timing after the first timing;
   a first AD (Analog/Digital) converter, in a second mode, capable of performing AD conversion by comparing the difference between the second signal and the first signal with a reference signal; and
   a second AD converter, in the second mode, performing AD conversion by comparing the difference between the third signal and the second signal with the reference signal,
   wherein the first AD converter includes a first comparator,
   wherein the first AD converter includes a first comparator, and
   wherein the second AD converter includes a second comparator, and
   the semiconductor device further comprising a controller,
   wherein the controller makes the first comparator execute auto zero, compares the first signal with the reference signal, and compares the difference between the second signal and the first signal with the reference signal, and
   wherein the controller makes the second comparator execute auto zero, compares the second signal with the reference signal, and compares the difference between the third signal and the second signal with the reference signal.

6. The semiconductor device according to claim 5,
   wherein the first AD converter includes a first buffer receiving an output from a first sample circuit,
   wherein the second AD converter includes a second buffer receiving an output from a second sample circuit,
   wherein a third AD converter includes a third buffer receiving an output from a third sample circuit,
   wherein the first AD converter includes a first coupling switching circuit enabling an output of the first buffer and an output of the second buffer to be input to a first input circuit,
   wherein the second AD converter includes a second coupling switching circuit enabling an output of the first buffer, an output of the second buffer, and an output of the third buffer to be input to a second input circuit, and wherein the third AD converter enables an output of the third buffer to be input to a third input circuit.

7. The semiconductor device according to claim 6, wherein in the case of shooting a picture without focus detection, the scanning circuit sets the first and second switches to "off" to make a first signal output from the pixel in a period before a first timing, and sets the first and second switches to "on" to make a third signal output from the pixel for a predetermined period from the first timing,
wherein in the case of shooting a still picture without focus detection, when the first signal is output from first, second, and third pixels from among the plurality of pixels, the controller controls a coupling switching unit so that an output of the first buffer is output to the first input circuit, an output of the second buffer is output to the second input circuit, and an output of the third buffer is output to a third output circuit,
wherein when the third signal is output from the first, second, and third pixels, the controller controls the coupling switching unit so that an output of the first buffer is output to the first input circuit, an output of the second buffer is output to the second input circuit, and an output of the third buffer is output to the third output circuit,
wherein in the case of shooting a still picture without focus detection, the first comparator, the second comparator, and a third comparator compare the difference between the third and first signals with the reference signal,
wherein the first AD (Analog/Digital) converter, in the second mode, performs AD conversion by comparing the difference between the second signal and the first signal with a reference signal in an analog domain, and
wherein the second AD converter, in the second mode, performs AD conversion by comparing the difference between the third signal and the second signal with the reference signal in the analog domain.

8. The semiconductor device according to claim 5, wherein the first mode comprises a case of shooting a picture with focus detection.

9. The semiconductor device according to claim 5, wherein the second mode comprises a case of shooting a moving picture with focus detection.

10. The semiconductor device according to claim 5, wherein each pixel of the plurality of pixels including a first photoelectric conversion element, a second photoelectric conversion element, a node, an output unit outputting voltage of the node to a data output line, the first switch between the first photoelectric conversion element and the node, and the second switch between the second photoelectric conversion element and the node.

11. A semiconductor device comprising:
a pixel array including a plurality of pixels arranged in a matrix, each pixel including a first switch and a second switch;
a scanning circuit, in a first mode, by controlling the first and second switches, enabling a first signal to be output from a pixel from among the plurality of pixels during a first timing period, enabling a second signal to be output from the pixel by setting during a second timing period, and enabling a third signal to be output from the pixel during a third timing period different than the first and second timing period;
a first AD (Analog/Digital) converter, in a second mode, capable of performing AD conversion by comparing the difference between the second signal and the first signal with a reference signal; and
a second AD converter, in the second mode, performing AD conversion by comparing the difference between the third signal and the second signal with the reference signal,
wherein the first AD converter further compares the first signal with the reference signal, and
wherein the second AD converter further compares the second signal with the reference signal.

12. The semiconductor device according to claim 11, wherein the first mode comprises a case of shooting a picture with focus detection.

13. The semiconductor device according to claim 11, wherein the second mode comprises a case of shooting a moving picture with focus detection.

14. The semiconductor device according to claim 11, wherein each pixel of the plurality of pixels including a first photoelectric conversion element, a second photoelectric conversion element, a node, an output unit outputting voltage of the node to a data output line, a first switch between the first photoelectric conversion element and the node, and a second switch between the second photoelectric conversion element and the node.

15. The semiconductor device according to claim 11, further comprising a controller,
wherein in the case of shooting a moving picture without focus detection, when the first signal is output from first, second, and third pixels from among the plurality of pixels, the controller controls a coupling switching unit so that an output of a first buffer is output to a second input circuit, an output of a second buffer is output to the second input circuit, and an output of a third buffer is output to a second output circuit,
wherein when the third signal is output from the first, second, and third pixels, the controller controls the coupling switching unit so that an output of the first buffer is output to the second input circuit, an output of the second buffer is output to the second input circuit, and an output of the third buffer is output to the second output circuit, and
wherein in the case of shooting a moving picture without focus detection, the second AD converter compares the difference between the third and first signals with the reference signal.

* * * * *